(12) United States Patent
Cirucci et al.

(10) Patent No.: US 12,521,670 B2
(45) Date of Patent: Jan. 13, 2026

(54) SYSTEM AND METHOD FOR EFFICIENT CARBON DIOXIDE CAPTURE

(71) Applicant: ARIZONA BOARD OF REGENTS ON BEHALF OF ARIZONA STATE UNIVERSITY, Scottsdale, AZ (US)

(72) Inventors: John Cirucci, Scottsdale, AZ (US); Klaus Lackner, Longmont, CO (US)

(73) Assignee: Arizona Board of Regents on Behalf of Arizona State University, Scottsdale, AZ (US)

( * ) Notice: Subject to any disclaimer, the term of this patent is extended or adjusted under 35 U.S.C. 154(b) by 327 days.

(21) Appl. No.: 18/255,078

(22) PCT Filed: Dec. 8, 2021

(86) PCT No.: PCT/US2021/062491
§ 371 (c)(1),
(2) Date: May 30, 2023

(87) PCT Pub. No.: WO2022/125717
PCT Pub. Date: Jun. 16, 2022

(65) Prior Publication Data
US 2024/0017203 A1   Jan. 18, 2024

Related U.S. Application Data

(60) Provisional application No. 63/123,219, filed on Dec. 9, 2020.

(51) Int. Cl.
*B01D 53/04* (2006.01)
*B01D 53/047* (2006.01)
*B01D 53/26* (2006.01)

(52) U.S. Cl.
CPC ..... *B01D 53/0454* (2013.01); *B01D 53/0438* (2013.01); *B01D 53/0446* (2013.01);
(Continued)

(58) Field of Classification Search
CPC ............ B01D 53/0454; B01D 53/0438; B01D 53/0446; B01D 53/04; B01D 53/0462;
(Continued)

(56) References Cited

U.S. PATENT DOCUMENTS

| | | | |
|---|---|---|---|
| 4,270,937 | A | 6/1981 | Adler |
| 4,324,564 | A | 4/1982 | Oliker |

(Continued)

FOREIGN PATENT DOCUMENTS

| | | |
|---|---|---|
| CA | 2688687 | 11/2008 |
| DE | 882541 | 7/1953 |

(Continued)

OTHER PUBLICATIONS

Department of the Army, U.S. Army Corps of Engineers, Mar. 1, 2001, "Engineering and Design: Adsorption Design Guide," Design Guide No. 1110-1-2.

(Continued)

*Primary Examiner* — Frank M Lawrence, Jr.
(74) *Attorney, Agent, or Firm* — FULLER IP LAW LLC; Rodney J. Fuller

(57) ABSTRACT

A system and method for the efficient collection of $CO_2$ is disclosed. The system includes a subsystem having a condenser and a vaporizer, and a plurality of vessels each having a sorbent and configured to transition between gas collection, gas recovery, and heat recovery phases. The gas collection phase includes the sorbent absorbing $CO_2$. The gas recovery phase has N stages, the vessels releasing a product gas and receiving vapor causing captured $CO_2$ to desorb. The first (N-1) gas recovery stages include the vessel coupled to the subsystem at a downstream pressure and a vessel in the heat recovery phase at an upstream pressure. The Nth gas recovery stage includes the vessel coupled to the condenser at the downstream pressure and the (Continued)

vaporizer at the upstream pressure. The heat recovery phase has (N−1) stages, each including the vessel being coupled to a vessel in the gas recovery phase.

20 Claims, 17 Drawing Sheets

(52) U.S. Cl.
CPC ....... *B01D 53/0462* (2013.01); *B01D 53/047* (2013.01); *B01D 53/261* (2013.01); *B01D 2253/102* (2013.01); *B01D 2253/108* (2013.01); *B01D 2253/206* (2013.01); *B01D 2257/504* (2013.01); *B01D 2258/06* (2013.01); *B01D 2259/40088* (2013.01); *B01D 2259/40092* (2013.01)

(58) Field of Classification Search
CPC ................ B01D 53/047; B01D 53/261; B01D 2253/102; B01D 2253/108; B01D 2253/206; B01D 2257/504; B01D 2258/06; B01D 2259/40088; B01D 2259/40092; B01D 2253/202; B01D 2257/80; B01D 2259/65; Y02C 20/40
USPC .......... 96/121–123, 126–128, 130, 143–145; 95/96, 97, 102, 106, 114, 115, 139; 423/230
See application file for complete search history.

(56) References Cited

U.S. PATENT DOCUMENTS

| | | | |
|---|---|---|---|
| 5,755,857 | A | 5/1998 | Acharya |
| 5,759,236 | A | 6/1998 | Thomas |
| 9,283,510 | B2 * | 3/2016 | Lackner ................. B01D 53/02 |
| 11,559,762 | B1 * | 1/2023 | Kuo ..................... B01J 20/3483 |
| 2009/0173073 | A1 | 7/2009 | Guidati |
| 2009/0232861 | A1 | 9/2009 | Wright |
| 2011/0203311 | A1 | 8/2011 | Wright |
| 2011/0265512 | A1 * | 11/2011 | Bearden ............... B01D 53/002 62/617 |
| 2011/0296872 | A1 * | 12/2011 | Eisenberger .......... B01D 53/81 96/111 |
| 2012/0312020 | A1 * | 12/2012 | Hume ................. B01D 53/1425 96/201 |
| 2013/0047664 | A1 * | 2/2013 | DiCenzo ............ B01D 53/0454 96/132 |
| 2013/0255597 | A1 | 10/2013 | Hall |
| 2014/0331864 | A1 * | 11/2014 | Ogino .................... B01D 53/08 96/145 |
| 2016/0207037 | A1 | 7/2016 | Lackner |
| 2017/0203249 | A1 * | 7/2017 | Gebald ................. B01D 53/62 |
| 2019/0022574 | A1 * | 1/2019 | Jin ........................ B01D 53/06 |
| 2020/0001225 | A1 | 1/2020 | Ritter |
| 2020/0009494 | A1 | 1/2020 | Ritter |
| 2020/0309451 | A1 | 10/2020 | Abarr |
| 2021/0187434 | A1 * | 6/2021 | Gebald ............... B01D 53/261 |
| 2021/0187438 | A1 | 6/2021 | Nishibe |
| 2024/0017202 | A1 | 1/2024 | Cirucci |
| 2024/0024811 | A1 | 1/2024 | Cirucci |

FOREIGN PATENT DOCUMENTS

| | | | |
|---|---|---|---|
| EP | 1710008 | 10/2006 | |
| EP | 2564914 | 3/2013 | |
| FR | 3025300 | 3/2016 | |
| WO | WO-2012111495 A1 * | 8/2012 | ............... F01K 7/40 |
| WO | 2019238488 | 12/2019 | |
| WO | 2021188547 | 9/2021 | |
| WO | 2022125717 | 6/2022 | |
| WO | 2022125718 | 6/2022 | |

OTHER PUBLICATIONS

Jacob, et al., (2015), "Energy Release Pathways in Nanothermites Follow Through the Condensed State," Combustior and Flame, 162, pp. 258-264.
Keith, et al. (2018), "A Process for Capturing CO2 from the Atmosphere," Joule, V2, 1573-1594.
Rezaei, et al. (2010), "Structured Adsorbents in Gas Separation Processes," Separation and Purification Technolgoy, 70, pp. 243-256.
Santori et al. (2018), "Adsorption artificial tree for atmospheric carbon dioxide capture, purification and compression," Energy, Elsevier, Amsterdam, NL, vol. 162, Aug. 14, 2018, pp. 1158-1168.
Wang, T., Lackner, K. S., & Wright, A. (2011). "Moisture swing sorbent for carbon dioxide capture from ambient air." Environmental science & technology, 45(15), 6670-6675.
Wang, T., Lackner, K. S., & Wright, A. B. (2013). "Moisture-swing sorption for carbon dioxide capture from ambient air: a thermodynamic analysis." Physical Chemistry Chemical Physics, 15(2), 504-514.
Wurzbacher et al. Concurrent Separation of CO2 and H2O from Air by Temperature Vacuum Swing Adsorption/Desorption Cycle. Environ. Sci. Technol. 2012, 46, 991-9198. (Year: 2012).
Wynnyk Kyle G., Hojjati Behnaz, Marriott Robert A., "Sour Gas and Water Adsorption on Common High-Pressure Desiccant Materials: Zeolite 3A, Zeolite 4A, and Silica Gel", Journal of Chemical and Engineering Data., American Chemical Society., US, US , (Jul. 11, 2019), vol. 64, No. 7, doi:10.1021/acs.jced.9b00233, ISSN 0021-9568, pp. 3156-3163, XP055950184.

* cited by examiner

SYSTEM AND METHOD FOR EFFICIENT CARBON DIOXIDE CAPTURE

RELATED APPLICATIONS

This application is the U.S. National Stage of International Patent Application No. PCT/US2021/062491, filed Dec. 8, 2021, which claims the benefit of and priority to U.S. provisional patent application No. 63/123,219, filed Dec. 9, 2020 titled "System and Method for Energy-Efficient Carbon Dioxide Capture," the contents of each of which are hereby incorporated by reference in their entireties.

TECHNICAL FIELD

Aspects of this document relate generally to carbon dioxide capture

BACKGROUND

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric carbon dioxide collectors can quickly overrun a tight energy budget for drawing in and processing air in bulk.

Capturing carbon dioxide from the atmosphere is challenging because of the low concentration of carbon dioxide in the atmosphere. Even though the theoretical minimum energy requirement for removing carbon dioxide from the air is quite small (roughly 22 kJ/mol), most practical processes involve large inefficiencies which make it difficult to operate near the theoretical optimum. The efficient capture and isolation of a useful product stream is crucial to widespread adoption of new carbon capture technologies.

SUMMARY

According to one aspect, a system for the efficient collection of carbon dioxide includes a recovery subsystem, the recovery subsystem including a heat pump in thermal communication with a condenser and a vaporizer, the condenser in fluidic communication with a reservoir. The recovery subsystem also includes a liquid pump in fluid communication with the reservoir and the vaporizer, the liquid pump configured to pump condensate to the vaporizer from the reservoir, revaporizing the condensate to form a water vapor, and a vacuum compressor in fluid communication with a product outlet providing a product stream and also in fluidic communication with the reservoir. The system include a plurality of sorbent vessels each including a sorbent structure having a sorbent material. Each sorbent vessel is in fluidic communication with the vacuum compressor, the condenser, and the vaporizer of the recovery subsystem and with at least a subset of the plurality of sorbent vessels. The fluidic communication of each sorbent vessel is controlled through a plurality of valves. Each sorbent vessel of the plurality of sorbent vessels is configured to transition between a gas collection phase, a gas recovery phase, and a heat recovery phase, with the plurality of sorbent vessels including the gas collection phase, the gas recovery phase, and the heat recovery phase simultaneously. The gas collection phase includes the sorbent material of the sorbent vessel being in fluidic communication with the atmosphere, absorbing carbon dioxide. The gas recovery phase has N gas recovery stages. Each sorbent vessel is configured to transition through each of the N gas recovery stages sequentially, the sorbent vessel releasing a product gas mixture and receiving water vapor causing captured carbon dioxide to desorb from the sorbent material. The first (N−1) gas recovery stages include the sorbent vessel being in fluidic communication with the recovery subsystem at a downstream pressure and a different sorbent vessel in the heat recovery phase at an upstream pressure. The nth gas recovery stage includes the sorbent vessel being in fluidic communication with the condenser at the downstream pressure and the vaporizer at the upstream pressure, the upstream pressure being greater than the downstream pressure for each gas recovery stage. The upstream pressure of each gas recovery stage is greater than the upstream pressure of the previous gas recovery stage. The heat recovery phase has (N−1) heat recovery stages. Each heat recovery stage includes the sorbent vessel being in fluidic communication with a different sorbent vessel in the gas recovery phase at a heating pressure. The heating pressure decreases in each subsequent heat recovery stage, the sorbent vessel configured to transition through each of the (N−1) heat recovery stages sequentially.

Particular embodiments may comprise one or more of the following features. The liquid pump of the recovery subsystem may be coupled to a make-up water valve, with liquid water being added to the condensate being pumped to the vaporizer for vaporization and use in the gas recovery phase. The vaporizer of the recovery subsystem may be coupled to a heat source. The heating pressure of a first heat recovery stage of the (N−1) heat recovery stages may be lower than any downstream pressure of the N gas recovery stages. The product stream may be continuous. The plurality of sorbent vessels may include at least 6 sorbent vessels. The gas collection phase may include separating the sorbent structure from the sorbent vessel. Each sorbent vessel may be coupled to every other sorbent vessel in the plurality of sorbent vessels. The sorbent material may be a temperature-swing sorbent material. The sorbent material may be a moisture-swing sorbent material. Each sorbent vessel may include a spray nozzle coupled to a liquid water supply. For each gas recovery stage, liquid water may be ejected through the spray nozzle creating a spray of liquid water droplets suspended in the water vapor having the upstream pressure so that liquid water is delivered to and deposited on the sorbent material to cause the carbon dioxide to desorb from the sorbent material.

According to another aspect of the disclosure, a system for the efficient collection of carbon dioxide includes a recovery subsystem having a heat pump in thermal communication with a condenser and a vaporizer. The condenser is in fluidic communication with a reservoir. The recovery subsystem also includes a liquid pump in fluid communication with the reservoir and the vaporizer. The liquid pump is configured to pump condensate to the vaporizer from the reservoir, revaporizing the condensate to form a water vapor. The recovery subsystem also includes a vacuum compressor in fluid communication with a product outlet providing a product stream and also in fluidic communication with the reservoir. The system includes a plurality of sorbent vessels having at least six sorbent vessels, each sorbent vessel including a spray nozzle and sorbent structure having a moisture-swing sorbent material. The spray nozzle is coupled to a liquid water supply. Each sorbent vessel is in fluidic communication with the vacuum compressor, the condenser, and the vaporizer of the recovery subsystem and with at least a subset of the plurality of sorbent vessels. The fluidic communication of each sorbent vessel is controlled through a plurality of valves. Each sorbent vessel of the plurality of sorbent vessels is configured to transition between a gas collection phase, a gas recovery phase, and a heat recovery phase, with the plurality of sorbent vessels including the gas collection phase, the gas recovery phase, and the heat recovery phase simultaneously. The gas collection phase includes the sorbent material of the sorbent vessel being in fluidic communication with the atmosphere, absorbing carbon dioxide. The gas recovery phase has N gas recovery stages. Each sorbent vessel is configured to transition through each of the N gas recovery stages sequentially, the sorbent vessel releasing a product gas mixture and receiving water vapor causing captured carbon dioxide to desorb from the sorbent material. The first (N−1) gas recovery stages include the sorbent vessel being in fluidic communication with the recovery subsystem at a downstream pressure and a different sorbent vessel in the heat recovery phase at an upstream pressure. The nth gas recovery stage includes the sorbent vessel being in fluidic communication with the condenser at the downstream pressure and the vaporizer at the upstream pressure. The upstream pressure is greater than the downstream pressure for each gas recovery stage. The upstream pressure of each gas recovery stage is greater than the upstream pressure of the previous gas recovery stage. The water vapor having the upstream pressure is a carrier gas forcing liquid water from the liquid water supply out of the spray nozzle, creating a spray of liquid water droplets to cause the carbon dioxide to desorb from the sorbent material. The heat recovery phase has (N−1) heat recovery stages. Each heat recovery stage includes the sorbent vessel being in fluidic communication with a different sorbent vessel in the gas recovery phase at a heating pressure. The heating pressure decreases in each subsequent heat recovery stage. The sorbent vessel is configured to transition through each of the (N−1) heat recovery stages sequentially.

Particular embodiments may comprise one or more of the following features. The liquid pump of the recovery subsystem may be coupled to a make-up water valve, with liquid water being added to the condensate being pumped to the vaporizer for vaporization and use in the gas recovery phase. The vaporizer of the recovery subsystem may be coupled to a heat source. The heating pressure of a first heat recovery stage of the (N−1) heat recovery stages may be lower than any downstream pressure of the N gas recovery stages. The product stream may be continuous. The gas collection phase may include separating the sorbent structure from the sorbent vessel. Each sorbent vessel may be coupled to every other sorbent vessel in the plurality of sorbent vessels.

According to yet another aspect of the disclosure, a method for the efficient collection of carbon dioxide includes placing a plurality of sorbent vessels in fluidic communication with a recovery subsystem of the system. The sorbent vessels belong to a system and each include a sorbent structure having a sorbent material. The recovery subsystem includes a heat pump in thermal communication with a condenser and a vaporizer. The condenser is in fluidic communication with a reservoir. The recovery subsystem also includes a liquid pump in fluid communication with the reservoir and the vaporizer. The liquid pump is configured to pump condensate to the vaporizer from the reservoir, revaporizing the condensate to form a water vapor. The recovery subsystem includes a vacuum compressor in fluid communication with a product outlet providing a product stream and also in fluidic communication with the reservoir. The method includes placing each sorbent vessel of a first subset of the plurality of sorbent vessels into a gas collection phase by placing the sorbent material of the sorbent vessel in fluidic communication with the atmosphere and absorbing carbon dioxide. The method also includes transitioning each sorbent vessel of a second subset of the plurality of sorbent vessels sequentially through N gas recovery stages of a gas recovery phase gradually increasing a sorbent vessel pressure and a sorbent vessel temperature. Each gas recovery stage includes the sorbent vessel receiving water vapor causing captured carbon dioxide to desorb from the sorbent material and the sorbent vessel releasing a product gas mixture including water vapor and carbon dioxide. The first (N−1) gas recovery stages include placing the sorbent vessel in fluidic communication with the recovery subsystem at a downstream pressure and a different sorbent vessel in a heat recovery phase at an upstream pressure. The nth gas recovery stage includes placing the sorbent vessel in fluidic communication with the condenser at the downstream pressure and the vaporizer at the upstream pressure. The upstream pressure is greater than the downstream pressure for each gas recovery stage. The upstream pressure of each gas recovery stage is greater than the upstream pressure of the previous gas recovery stage. The method further includes transitioning each sorbent vessel of a third subset of the plurality of sorbent vessels sequentially through (N−1) heat recovery stages of the heat recovery phase, gradually decreasing the sorbent vessel pressure and the sorbent vessel temperature. Each heat recovery stage includes placing the sorbent vessel in fluidic communication with a different sorbent vessel in the gas recovery phase at a heating pressure, the heating pressure decreasing in each subsequent heat recovery stage. The gas collection phase, the gas recovery phase, and the heat recovery phase all exist at the same time within the plurality of sorbent vessels.

Particular embodiments may comprise one or more of the following features. The method may further include replacing water lost from the system by adding liquid water from a make-up water valve to the condensate being pumped to the vaporizer for vaporization and use in the gas recovery phase. The vaporizer of the recovery subsystem may be coupled to a heat source. The heating pressure of a first heat recovery stage of the (N−1) heat recovery stages may be lower than any downstream pressure of the N gas recovery stages. The product stream may be continuous. The plurality of sorbent vessels may include at least 6 sorbent vessels. Placing each sorbent vessel of the first subset into the gas collection phase may include separating the sorbent structure from each sorbent vessel. Each sorbent vessel may be coupled to every other sorbent vessel in the plurality of sorbent vessels. The sorbent material may be a temperature-swing sorbent material. The sorbent material may be a moisture-swing sorbent material. Each sorbent vessel may include a spray nozzle coupled to a liquid water supply. For each gas recovery stage, liquid water may be ejected through the spray nozzle creating a spray of liquid water droplets suspended in the water vapor having the upstream pressure so that liquid water is delivered to and deposited on the sorbent material to cause the carbon dioxide to desorb from the sorbent material.

Aspects and applications of the disclosure presented here are described below in the drawings and detailed description. Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

The disclosure will hereinafter be described in conjunction with the appended drawings, where like designations denote like elements, and.

DETAILED DESCRIPTION

Figure 1:
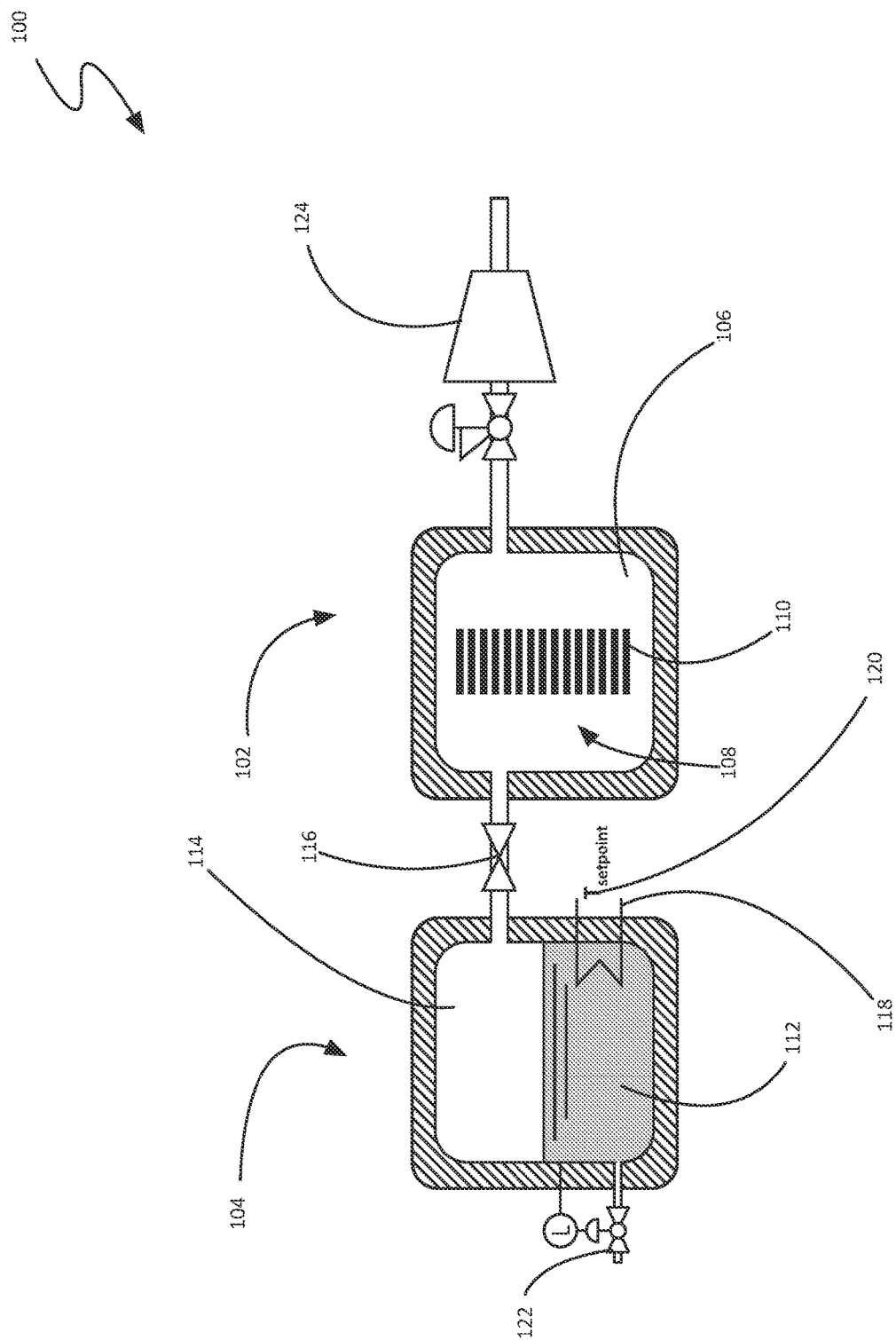
FIG. 1 is a schematic view of a single capture device.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented, but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems, and is not intended to limit the broad aspect of the disclosed concepts to the embodiments illustrated.

The need for technologies to remove carbon dioxide from ambient air has been well established. In addition to conservation, reduced-carbon processes, and on-site capture efforts, a significant amount of carbon dioxide will need to be removed from the atmosphere to avoid a looming climate change crisis. Nevertheless, the technologies are still new and the early air capture processes require large amounts of energy to operate. Since the carbon dioxide in the ambient air is very dilute, atmospheric carbon dioxide collectors can quickly overrun a tight energy budget for drawing in and processing air in bulk.

Capturing carbon dioxide from the atmosphere is challenging because of the low concentration of carbon dioxide in the atmosphere. Even though the theoretical minimum energy requirement for removing carbon dioxide from the air is quite small (roughly 22 kJ/mol), most practical processes involve large inefficiencies which make it difficult to operate near the theoretical optimum. The efficient capture and isolation of a useful product stream is crucial to widespread adoption of new carbon capture technologies.

FIG. 1 is a schematic view of a non-limiting example of a single capture device 100. This exemplary device 100 demonstrates the basic operation of a single capture device, providing context for a discussion of the benefits of implementing this process in multiple instances working together, as well as the obstacles to making such an integration efficient.

As shown, the capture device 100 comprises a sorbent vessel 102 coupled to a water vessel 104. In the context of the present description and the claims that follow, a sorbent vessel 102 is an insulated container having a void space 106 and a sorbent structure 108 comprising a sorbent material 110 (e.g., temperature-swing sorbent, moisture-swing sorbent, etc.).

As shown, the water vessel 104 is partially filled with liquid water 112. According to various embodiments, the water vessel 104 may have a heating element 118 controlled to maintain a set-point temperature 120 of the liquid water 112, and level-controlled make-up water valve 122 so that the amount of liquid also remains constant. If evacuated of all other vapor components, the water boils and a portion of liquid evaporates to fill the headspace of the water vessel until the device pressure equilibrates to the saturated vapor pressure associated with the set-point temperature 120, while the heating element 118 adds the heat required to maintain this temperature. The make-up water valve 122 allows the addition of liquid water 112 equivalent to the amount that evaporates into the headspace. Once the pressure and temperature equilibrate, no further heat or water is added.

According to some embodiments, this device 100 also comprises a vacuum compressor 124 connected to the sorbent vessel 102, and controlled so that sufficient vapor 114 is drawn by the vacuum compressor 124 to maintain the sorbent vessel 102 total pressure at a set point pressure, at or below the water vessel saturated vapor pressure.

Next, a connector valve is opened connecting the vapor space of the water vessel 104 to the sorbent vessel 102. According to various embodiments, the sorbent vessel 102 is initially fully evacuated, and the sorbent material 110 is at some temperature lower than the set point temperature 120 of the water vessel. In some embodiments, the connector valve 116 may simply be piping, while in other embodiments, the two vessels may be integrated into a single enclosure such that the water liquid reservoir is in the base and the sorbent is in the headspace.

When the connector valve 116 opens, water vapor 114 flows to the sorbent vessel 102 to fill its evacuated void 106. Adiabatic expansion causes the water vapor 114 to cool slightly as it undergoes a pressure drop. However, the extent of cooling is much less than the lowering of the water dew point, so that the water vapor 114 actually becomes superheated. For example, water vapor 114 saturated at 60° C., 20 kPa, then expanded to 5 kPa, cools to 58° C. but its dewpoint falls to 33° C. Adiabatic expansion cooling is countered as the sorbent vessel 102 fills and the vapor 114 already in the sorbent vessel 102 is adiabatically compressed. As water vapor 114 continues to flow into the sorbent vessel, the sorbent vessel pressure increases and the water vapor dew point temperature increases.

Some water vapor 114 bypasses the sorbent structure 108 and is drawn directly out through the vacuum compressor 124. The water also condenses or is sorbed onto the sorbent material 110, and the temperature of the sorbent 110 increases until it reaches the saturated temperature associated with the set point pressure. The final temperature of the sorbent is maximized if the set point pressure is held near the water vessel saturated vapor pressure.

Once the sorbent 110 is at maximum temperature and water capacity, the make-up water and vacuum suction mass flow rates are equivalent. At this time, the totalized amounts of added heat and water are greater than those of the device 100 without the vacuum compressor since additional water is evaporated corresponding to the amount of water drawn through the vacuum outlet.

As discussed above, for the $CO_2$ recovery stage of a capture device 100, the sorbent material 110 is initially loaded with carbon dioxide which is released by water addition, temperature rise, pressure reduction, or some combination. The endothermic desorption of $CO_2$ consumes heat. The partial pressure of desorbed $CO_2$ contributes to the total pressure in the sorbent vessel 102 and the composition of the evacuated gas. In a well-mixed system, the total pressure is not greater than the sum of the equilibrium partial pressures of $CO_2$ and water (at the sorbent vessel temperature). Water vapor 114 will not flow from the water vessel 104 unless its saturated vapor pressure exceeds this total pressure in the sorbent vessel. If the vacuum rate is increased, the sorbent vessel pressure is reduced. Subsequently, the total sorbent vessel pressure drops. For a given $CO_2$ partial pressure, the outlet concentration increases. However, since the water condensation temperature is lower, the $CO_2$ sorption equilibrium pressure will be reduced.

In some embodiments, heat can be recovered in a heat recovery stage with the reversal of water condensation/sorption by continuing evacuation after $CO_2$ has been removed. According to various embodiments, closing the connector valve 116 and continuing to evacuate the sorbent vessel 102 will cause the sorbent 110 to undergo evaporative cooling. The energy originally required to vaporize this water can be partially recovered by diverting the hot vapor discharge of the vacuum compressor 124 to a second device 100b which is still in the $CO_2$ recovery stage of the cycle. According to various embodiments, this may reduce, or even eliminate, the heat duty required to vaporize water in the water vessel 104.

Figure 2:
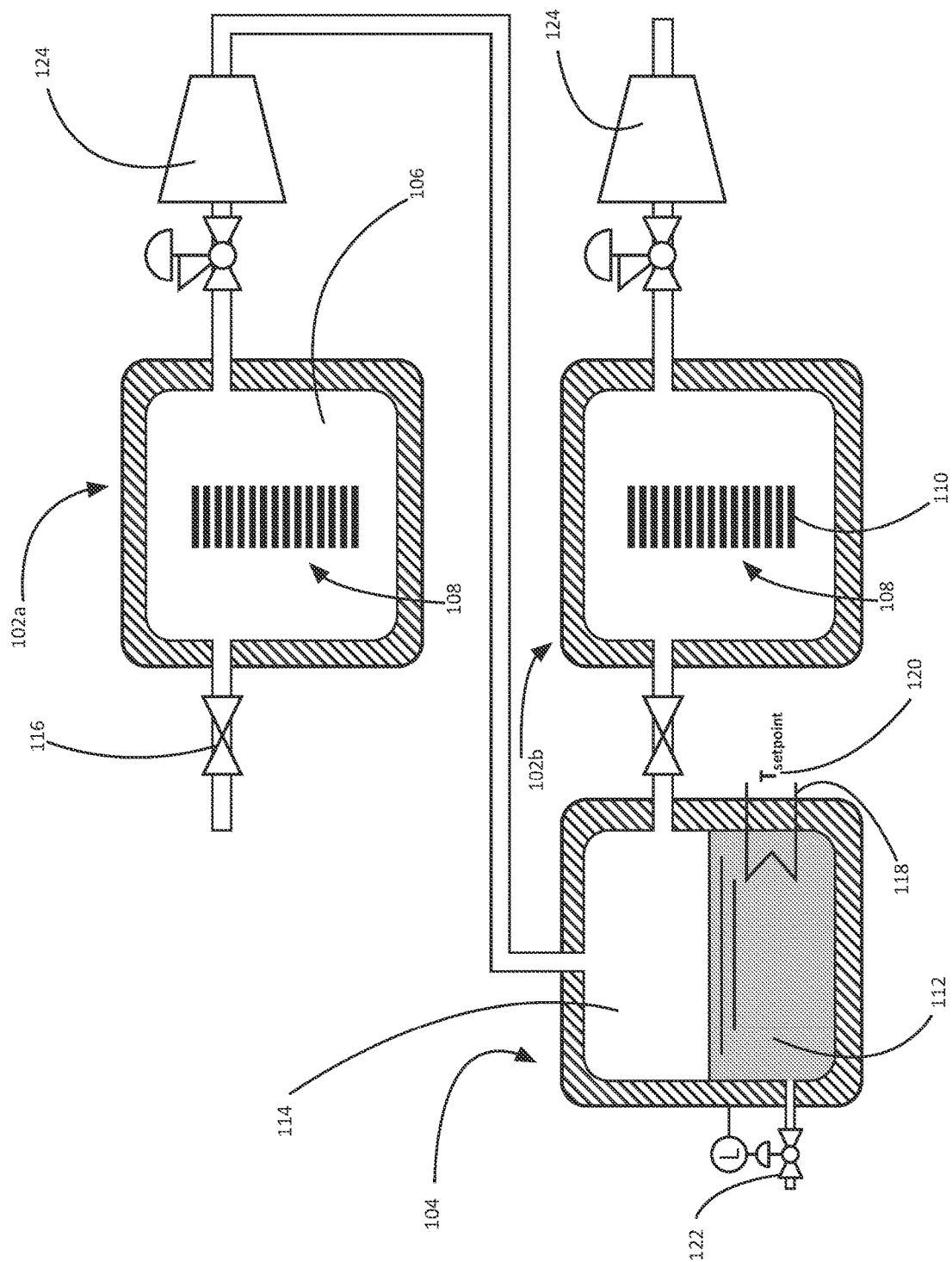
FIG. 2, is a schematic view of two capture devices recovering heat during operation.

FIG. 2 is a schematic view of a non-limiting example of recovering heat between two capture devices 100a and 100b. According to various embodiments, at the beginning of a heat recovery action, the compression energy requirement is minimal—just enough to overcome the transfer pressure drop. As the sorbent 110 cools, the water vapor pressure drops and the compression energy requirement becomes greater. As a specific example, in one embodiment, for a heat recovery stage operating between 60° C. and 25° C. (i.e., 20 and 3 kPa), given a 4 kPa transfer pressure drop and 75% isentropic compression efficiency, the compression energy requirement begins at about 700 J/mol $H_2O$ and increases to finally about 8600 J/mol $H_2O$. This is collectively only about 10% of the energy that would have been required to vaporize that water in the water vessel 104, an order of magnitude reduction. Additional benefits with energy recovery system coupling include, but are not limited to, the recovery of water 112 (at least that portion associated with heating and cooling the sorbent 110), and recovery of any residual $CO_2$.

As a practical issue, the adiabatic heat of compression results in superheated steam at the compressor discharge. Continuing the specific example given above, operating between an initial sorbent temperature of 60° C. and a final sorbent temperature of 25° C., steam at the compressor discharge varies from 80° C. to 275° C. over the course of water withdrawal, so that this stream requires some cooling.

In some embodiments, this cooling may be provided by thermal integration with downstream purification unit operations.

In some embodiments, the superheat and compression energy can be substantially reduced by a further, more complex arrangement involving a change in the $CO_2$ recovery stage heating method. Instead of feeding saturated water vapor 114 at a fixed temperature, it is advantageous to ramp the water vapor temperature, increasing it as the sorbent temperature increases, in order that the pressure difference and temperature difference between the sorbent vessel remains small and nearly constant. This reduces entropy loss. It can be accomplished when done in conjunction with a heat recovery water vapor recycle. During the heat recovery stage, the compressor 124 discharge pressure is slowly decreased as the sorbent 110 cools, so that the compressor 124 power and outlet superheat are kept low, according to various embodiments.

Through connecting multiple collectors that are at different levels of progression in $CO_2$ recovery, the variability in the flow rate and composition of the combined outlets streams can be minimized so that near steady state conditions may be achieved. However, from an efficiency standpoint, mixing dissimilar streams (e.g., temperatures, pressures, etc.) can be costly.

Contemplated herein is a system and method for efficient carbon dioxide capture using multiple sorbent vessels. Advantageous over conventional methods and simple operation as discrete devices like device 100 of FIG. 1, the contemplated system and method integrates a plurality of capture "units", which may be as complicated as the previously discussed device 100, but may also, in some embodiments, be simplified to just a collection of sorbent vessels 102. By pairing vessels 102 together based on where they are at within the different phases of the capture/release cycle, the inefficiencies caused by mixing dissimilar elements may be lessened, or even avoided altogether.

Sharing equipment and resources, such as compressors, pumps, make-up water, and the like, among capture units could reduce the capital cost to get the system up and running. If a sufficiently large number of devices are operating together, capture devices that would otherwise provide intermittent product streams can together provide a continuous product stream, which expands the potential applications for the harvested gas.

Figure 3A:
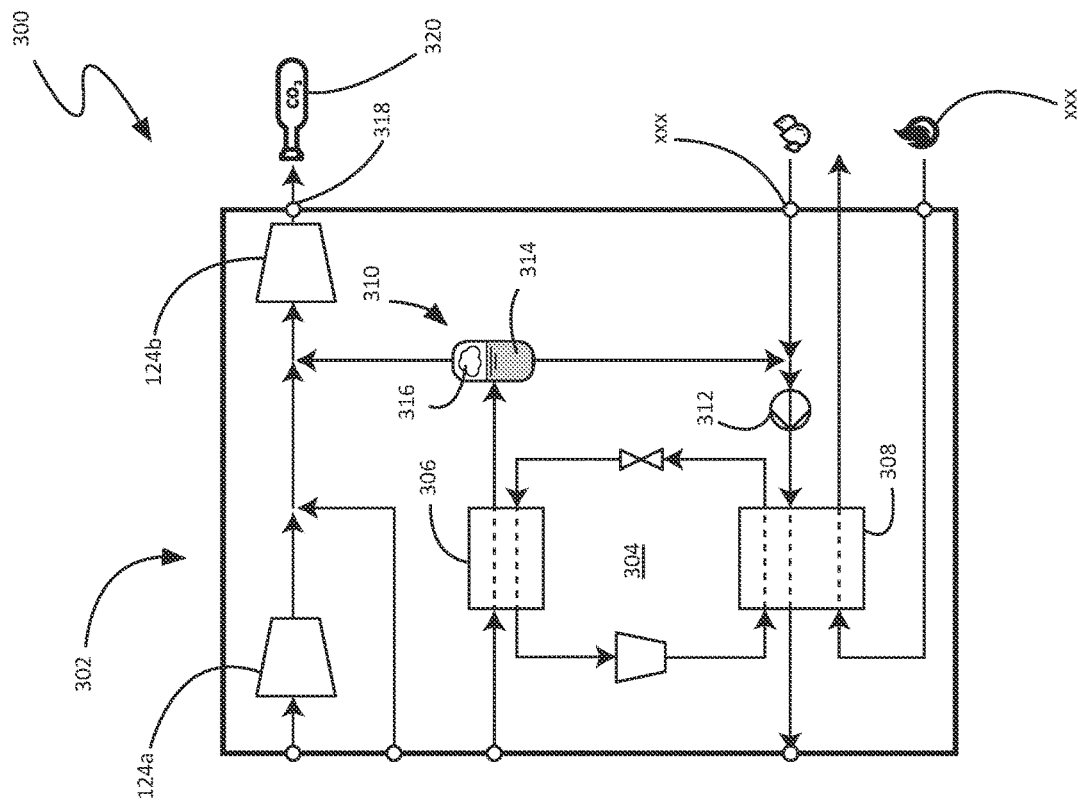
FIG. 3A is a schematic view of structure of the contemplated system for efficient carbon dioxide capture.
Figure 3A:
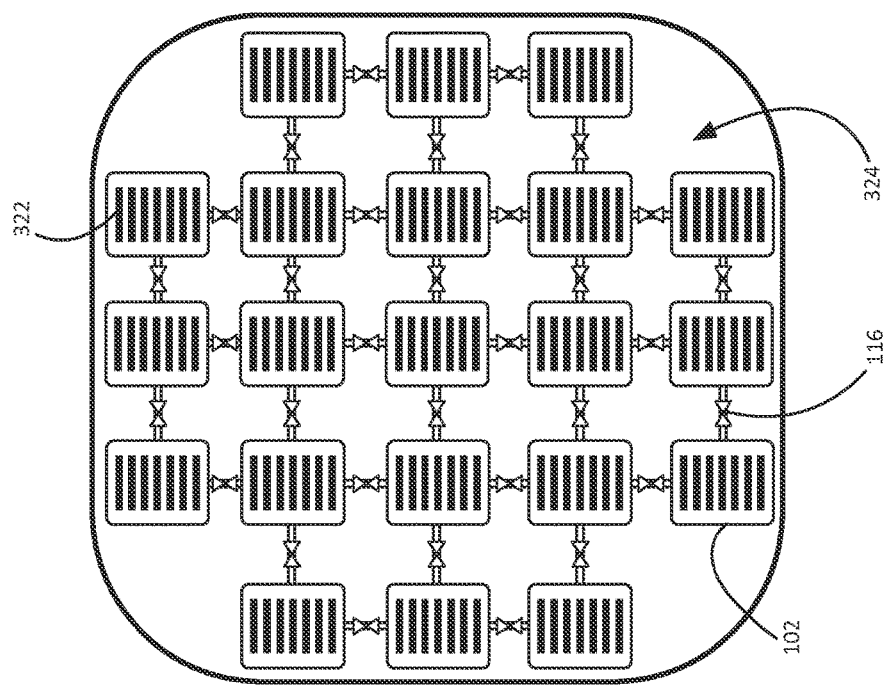
Figure 3B:
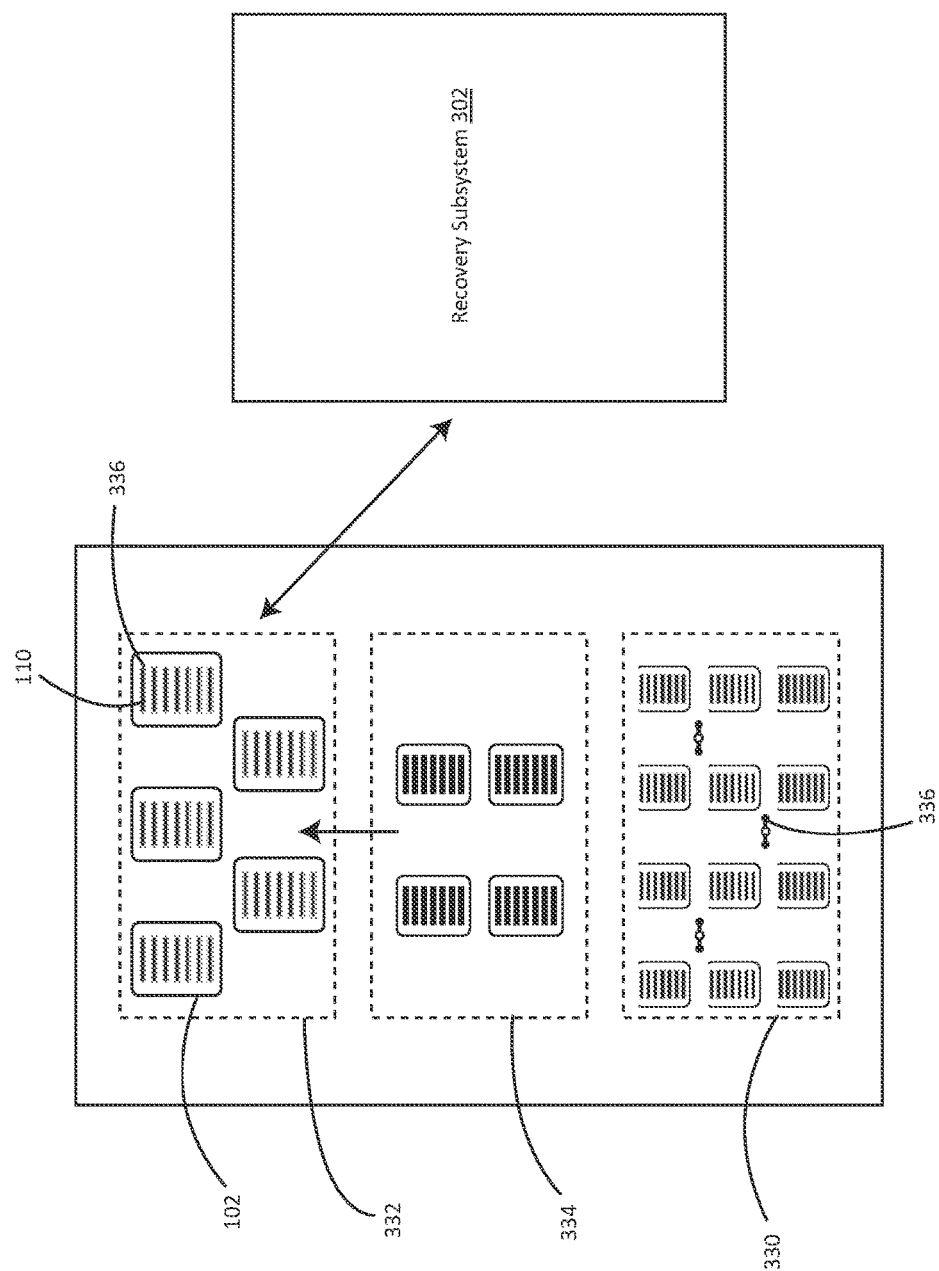
FIG. 3B is a schematic view of the contemplated system while in operation.
Figure 4A:
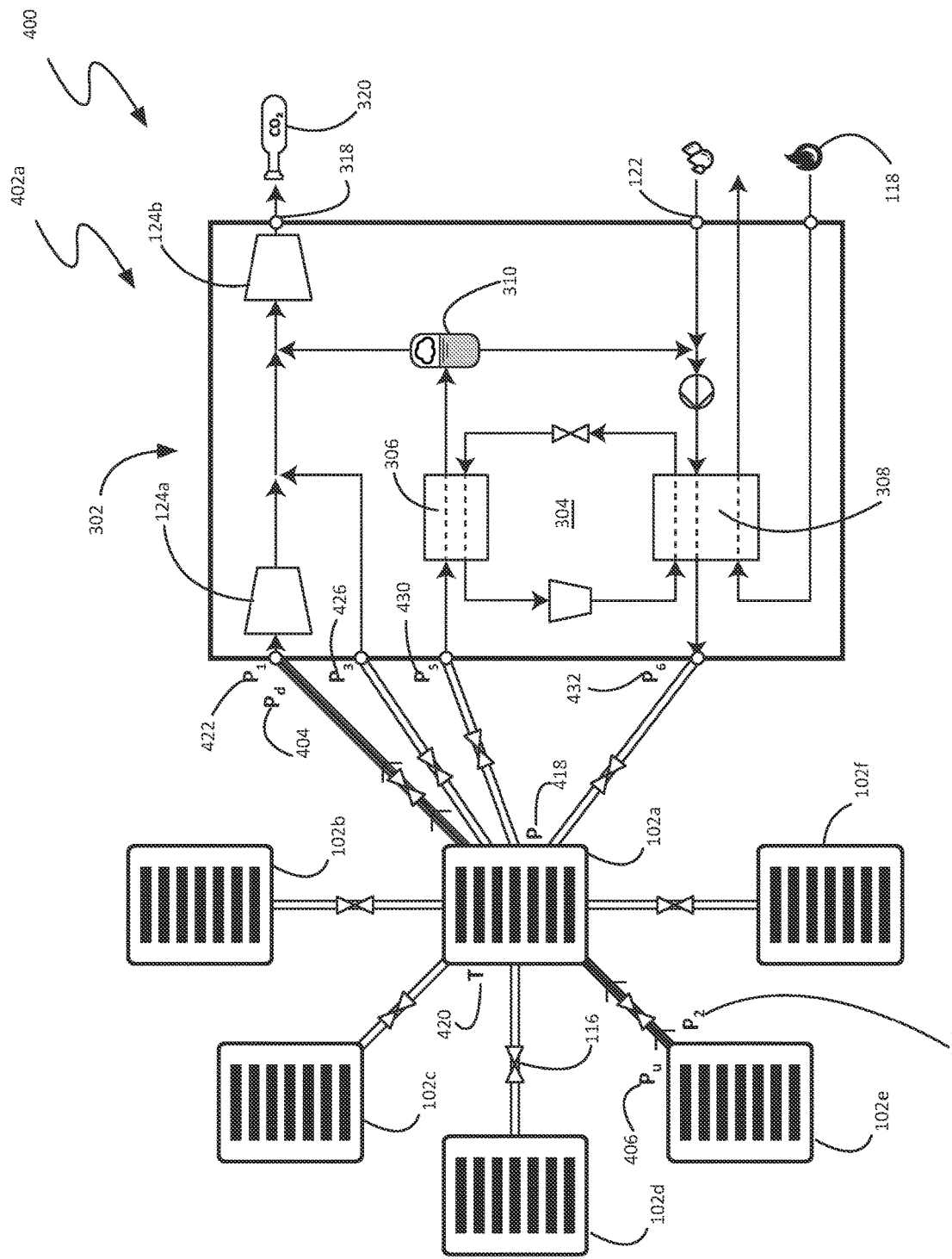
FIGS. 4A-4F are schematic views of the stages of the three phases for an exemplary system, from the perspective of a single sorbent vessel within the system.
Figure 4B:
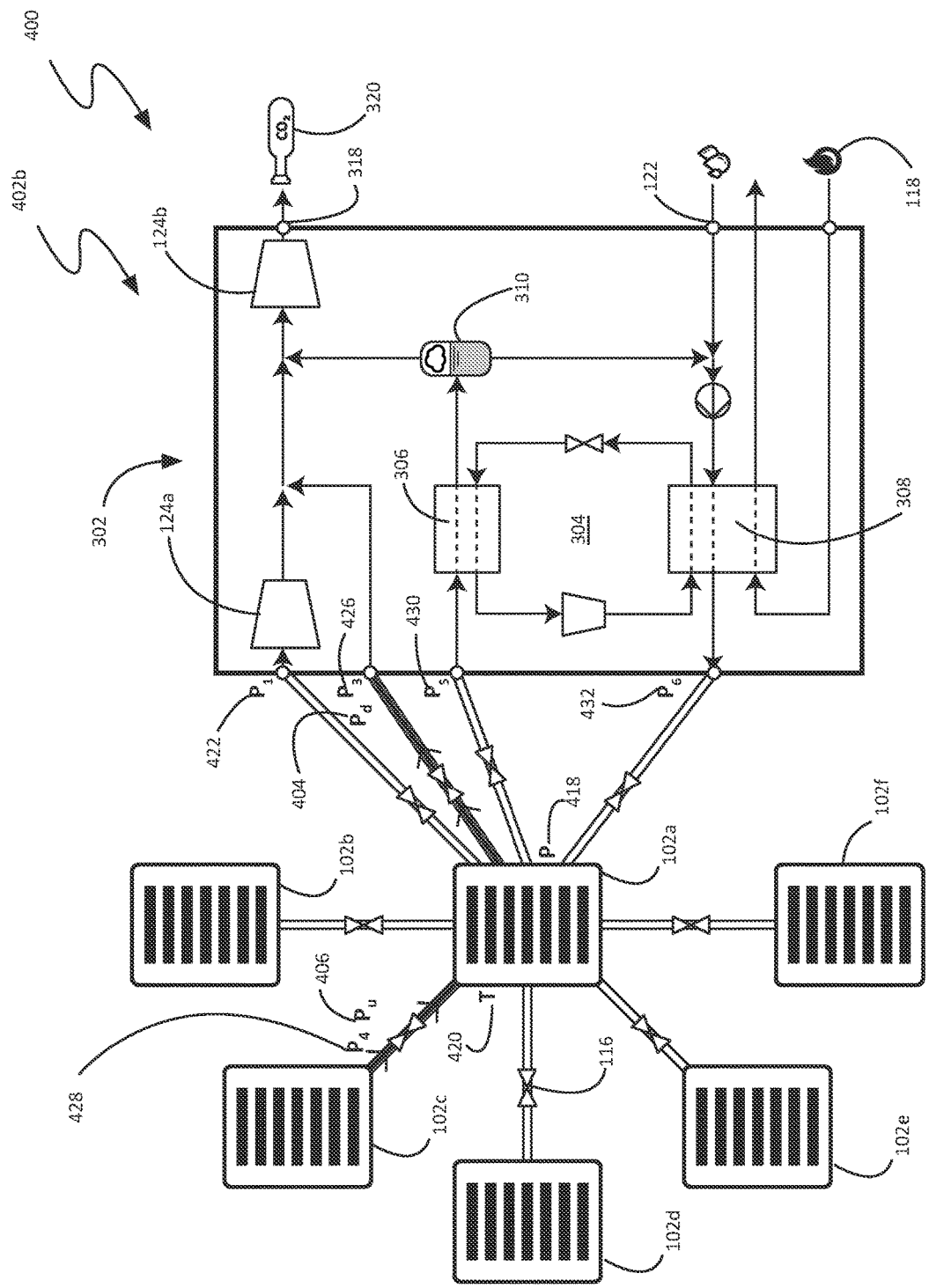
Figure 4C:
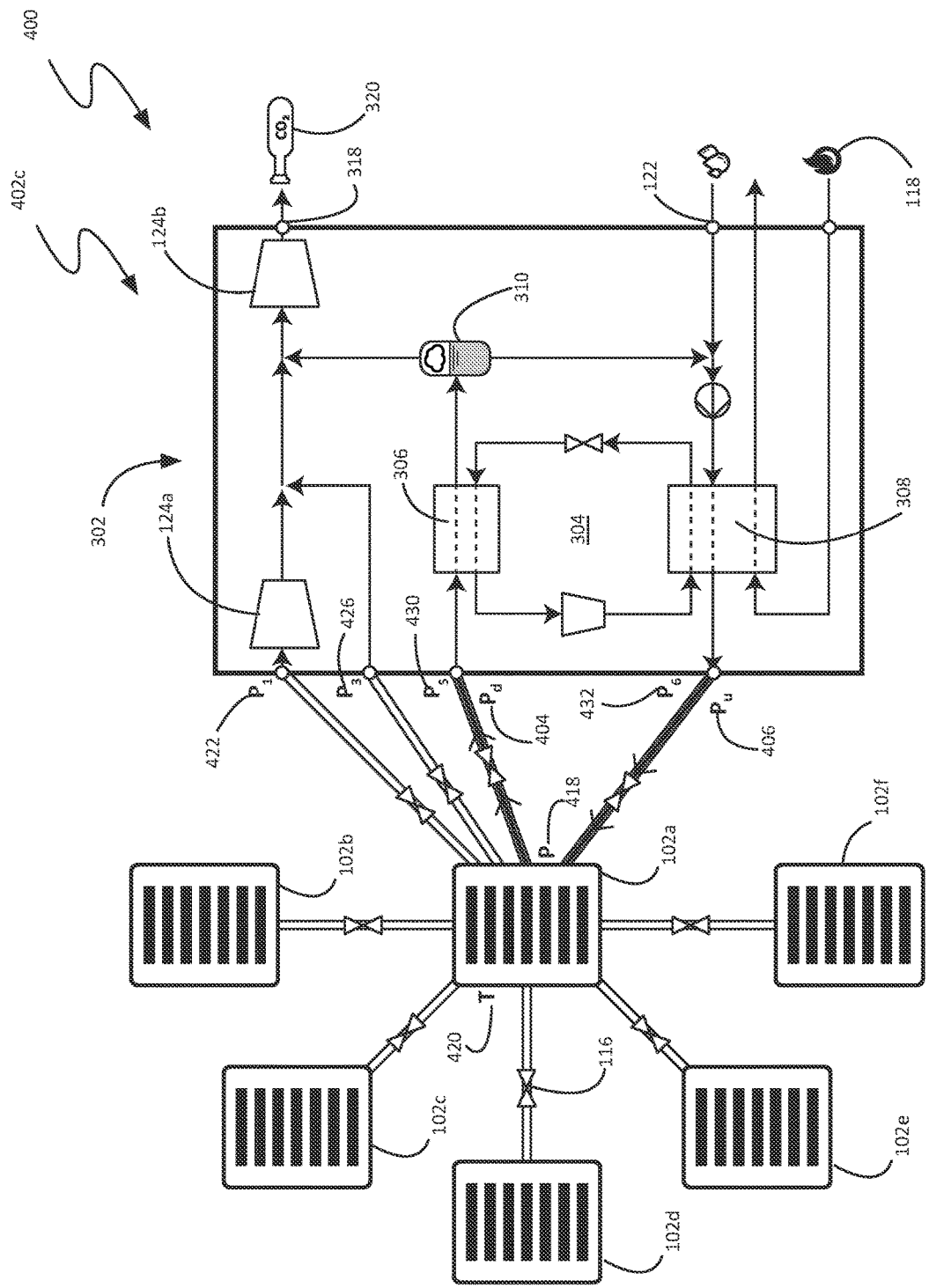
Figure 4D:
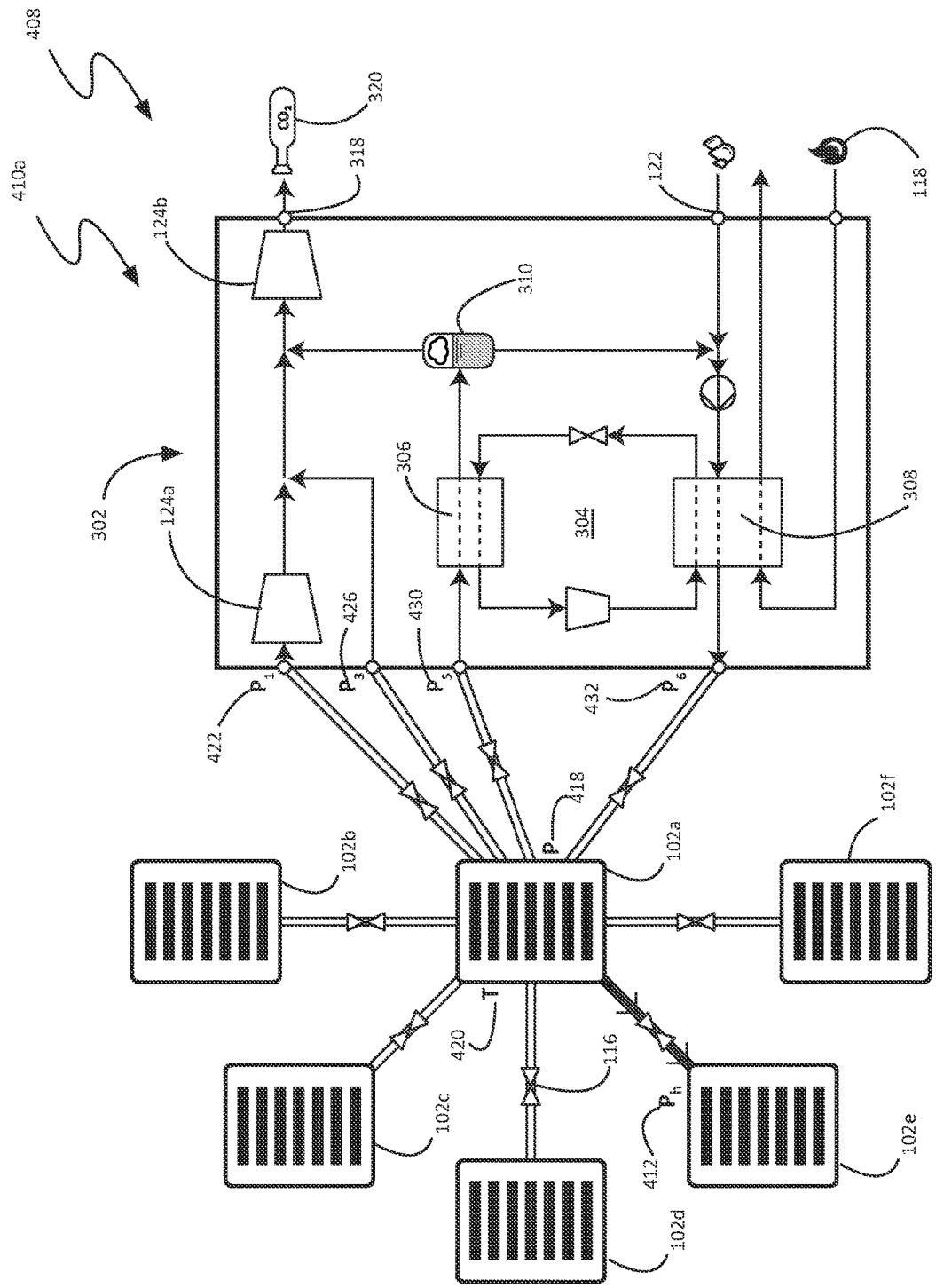
Figure 4E:
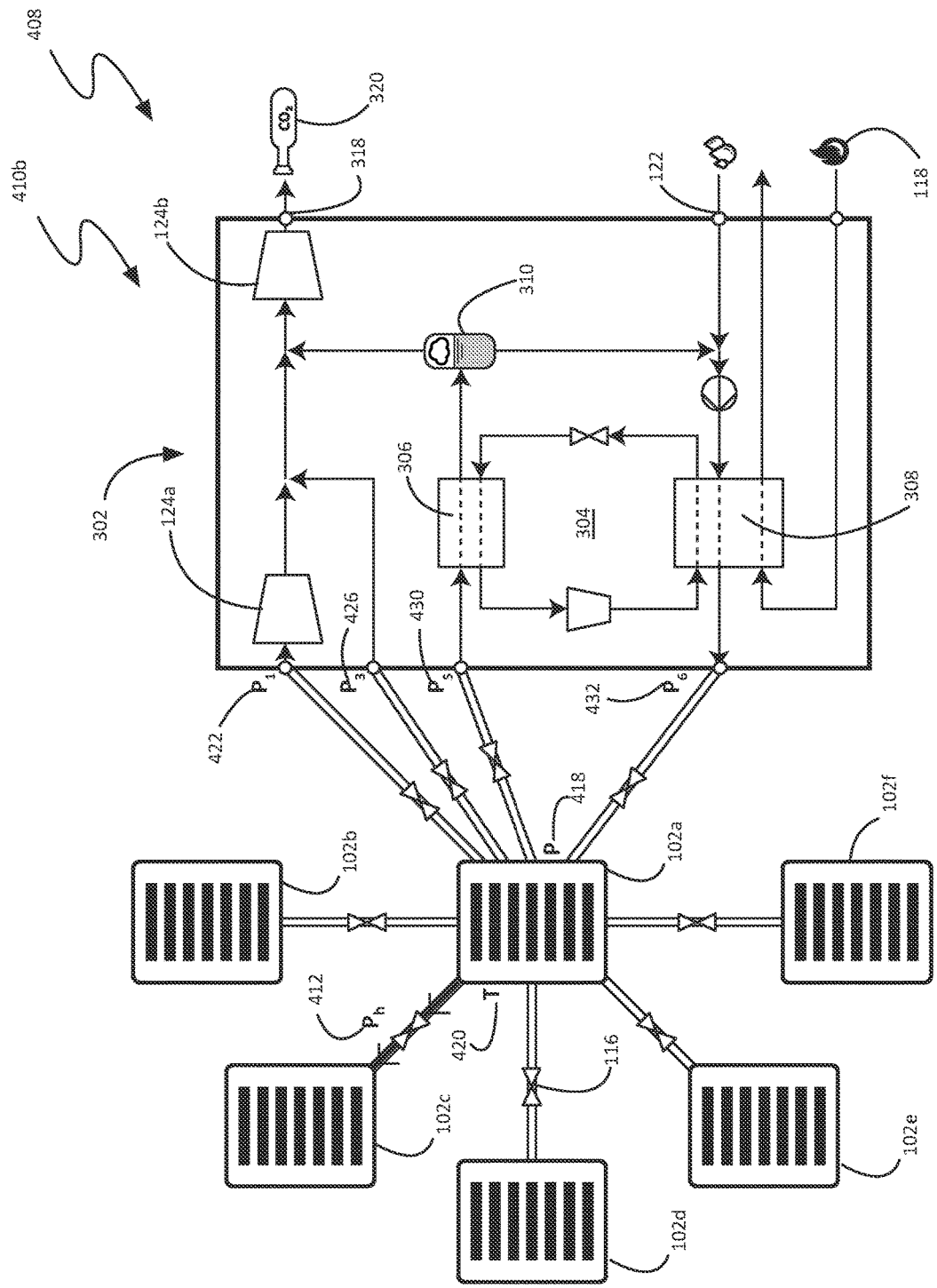
Figure 4F:
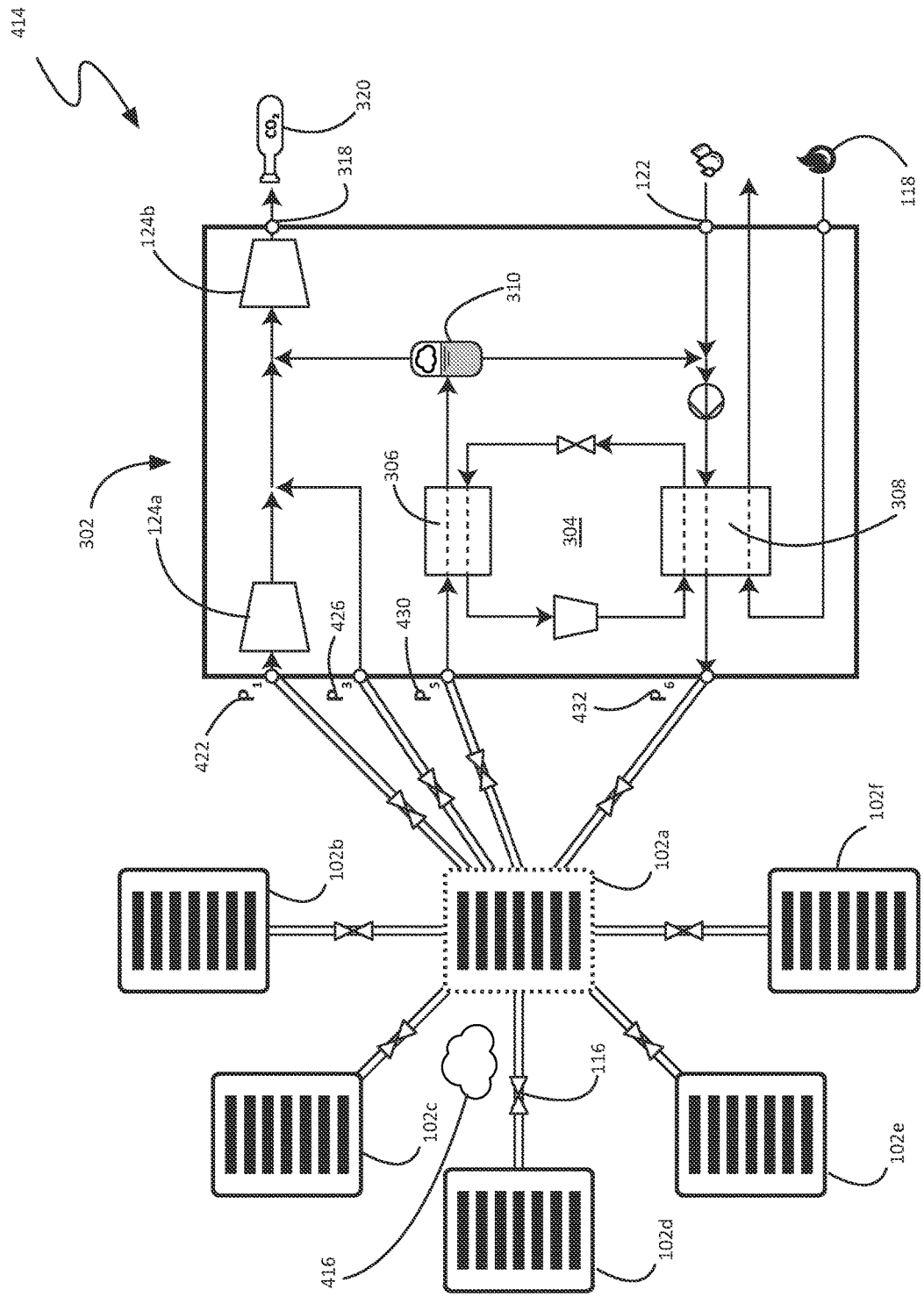
Figure 5A:
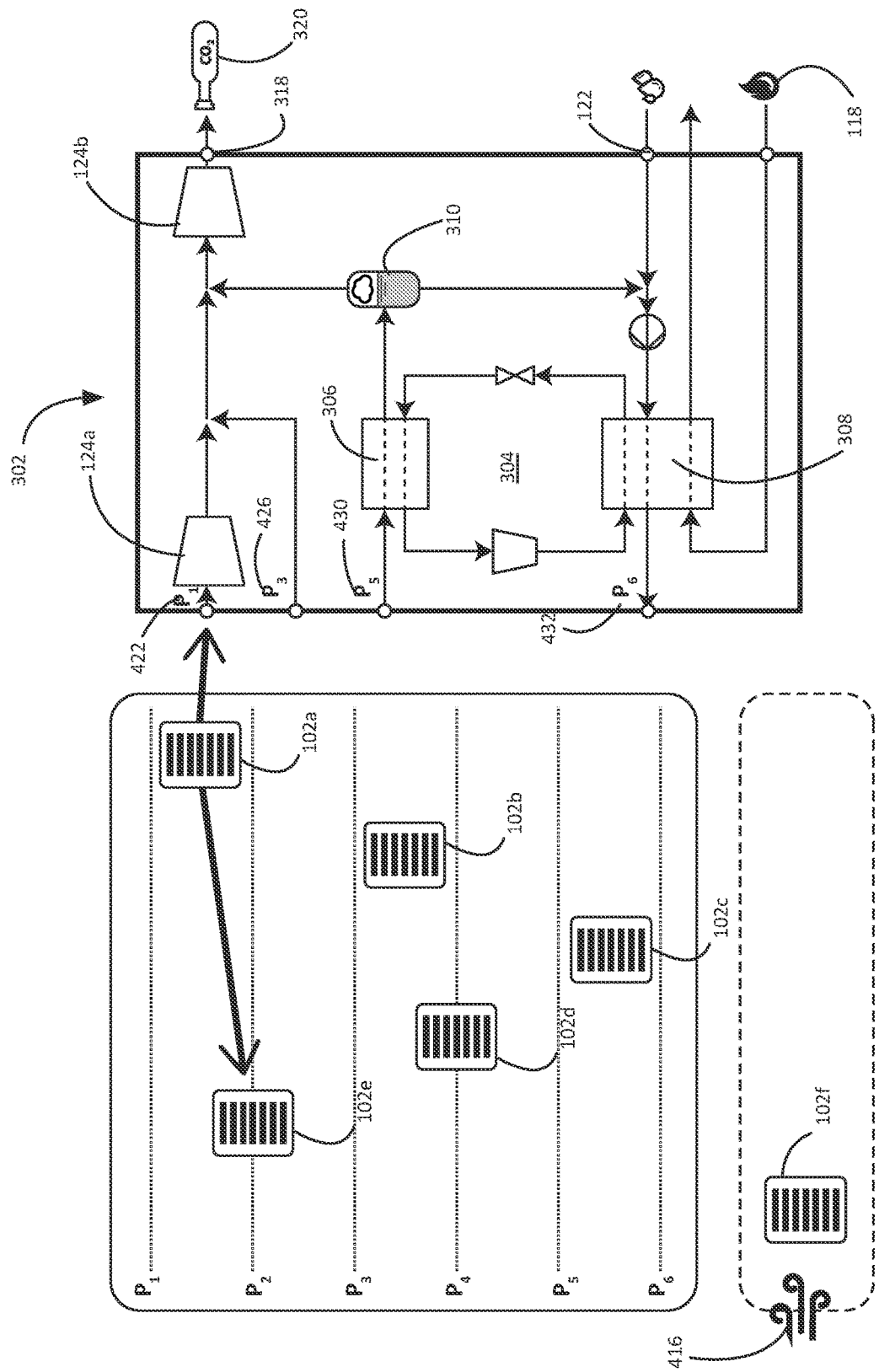
FIGS. 5A-5F are schematic representations of the contemplated system of FIGS. 4A-4F showing the relative pressures of various sorbent vessels throughout the stages of the three phases.
Figure 5B:
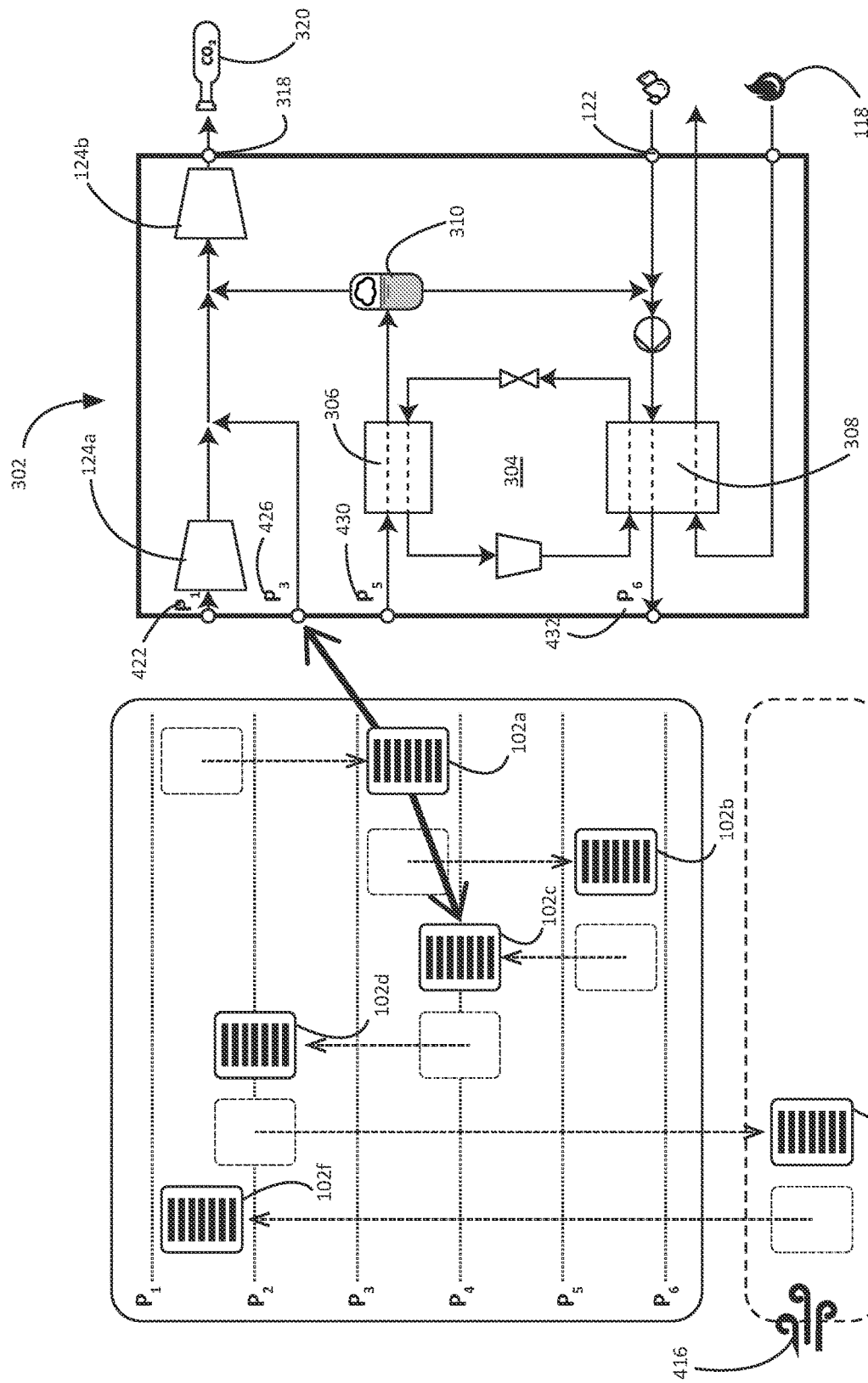
Figure 5C:
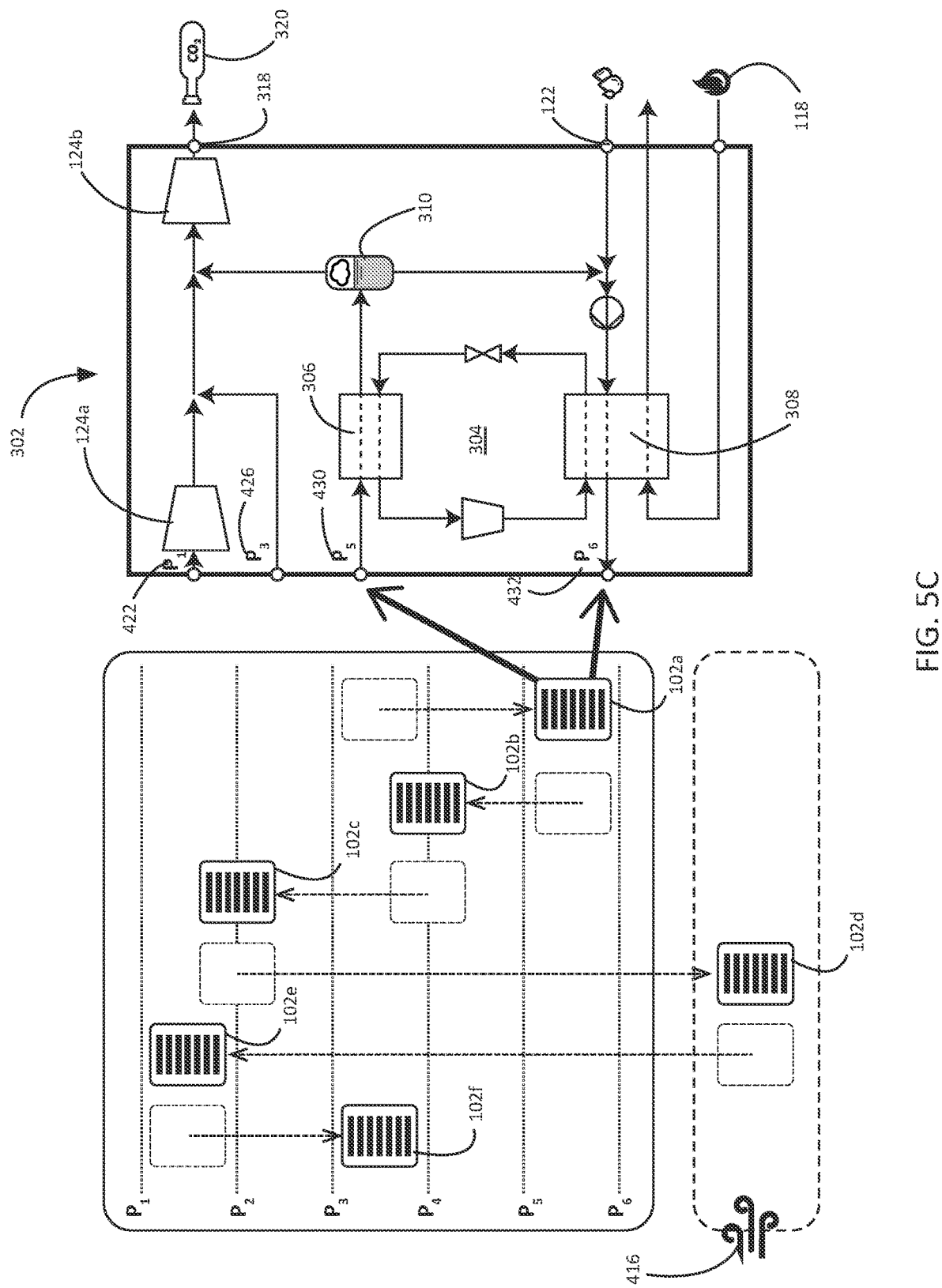
Figure 5D:
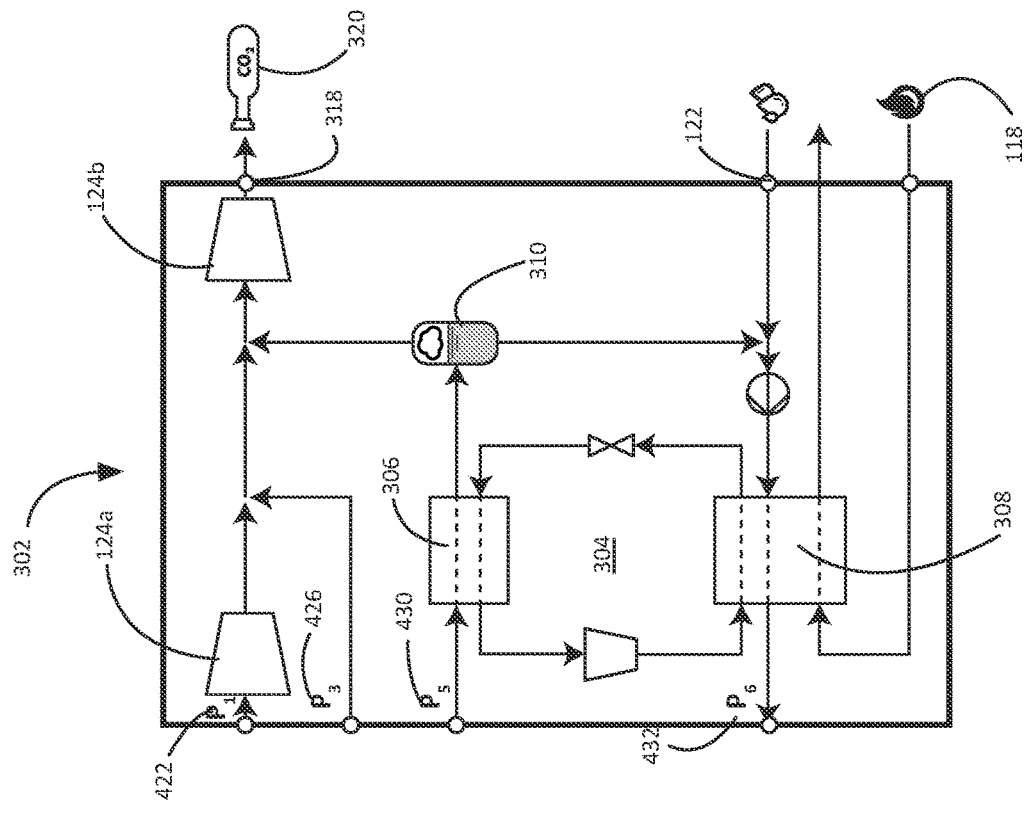
Figure 5D:
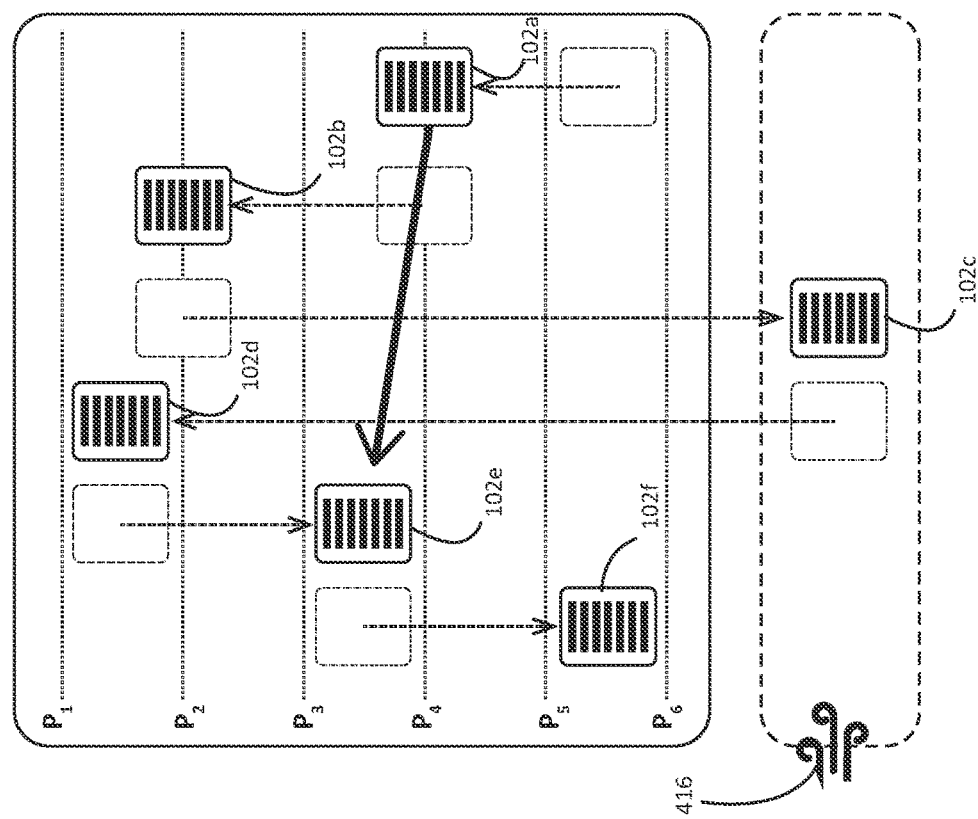
Figure 5E:
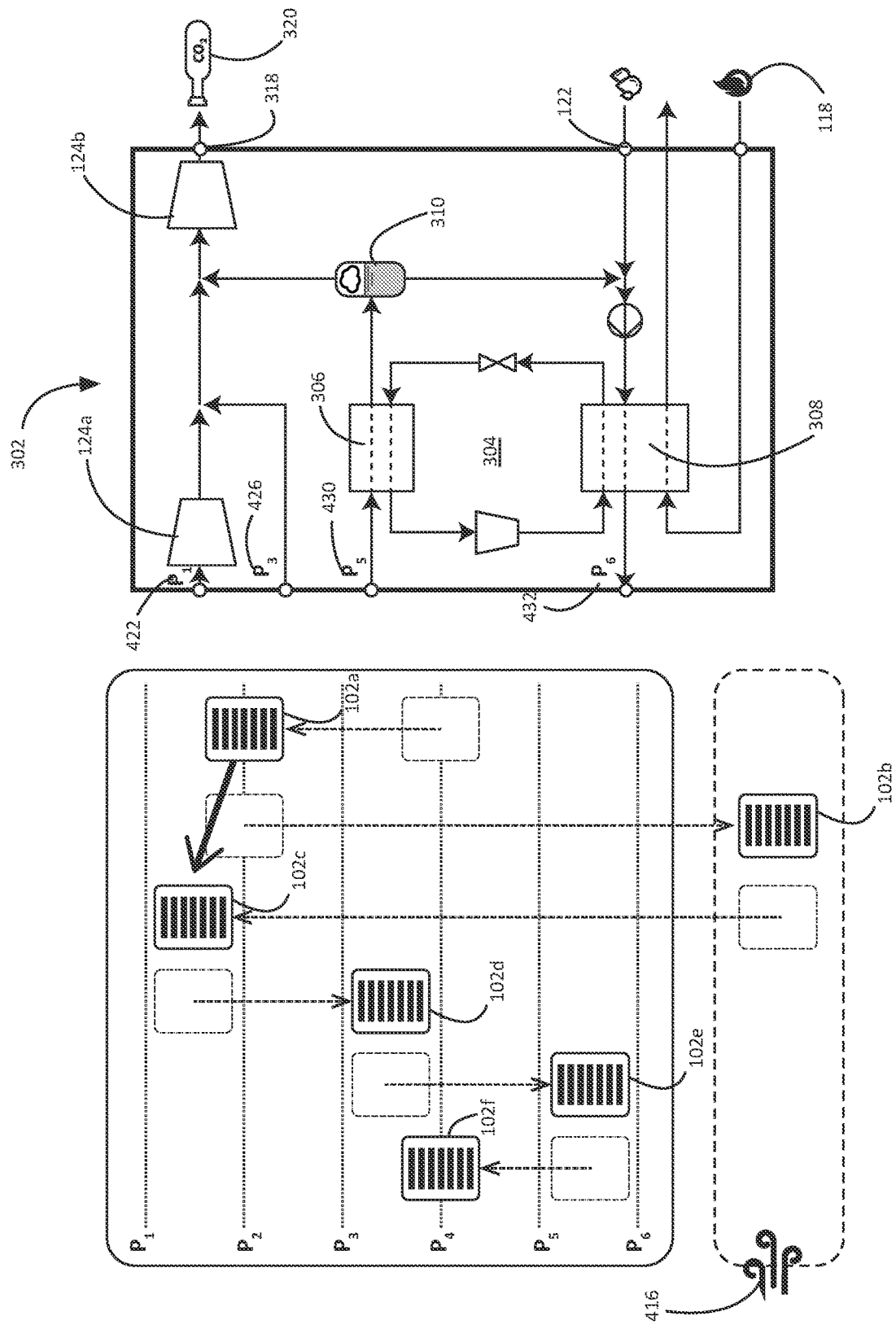
Figure 5F:
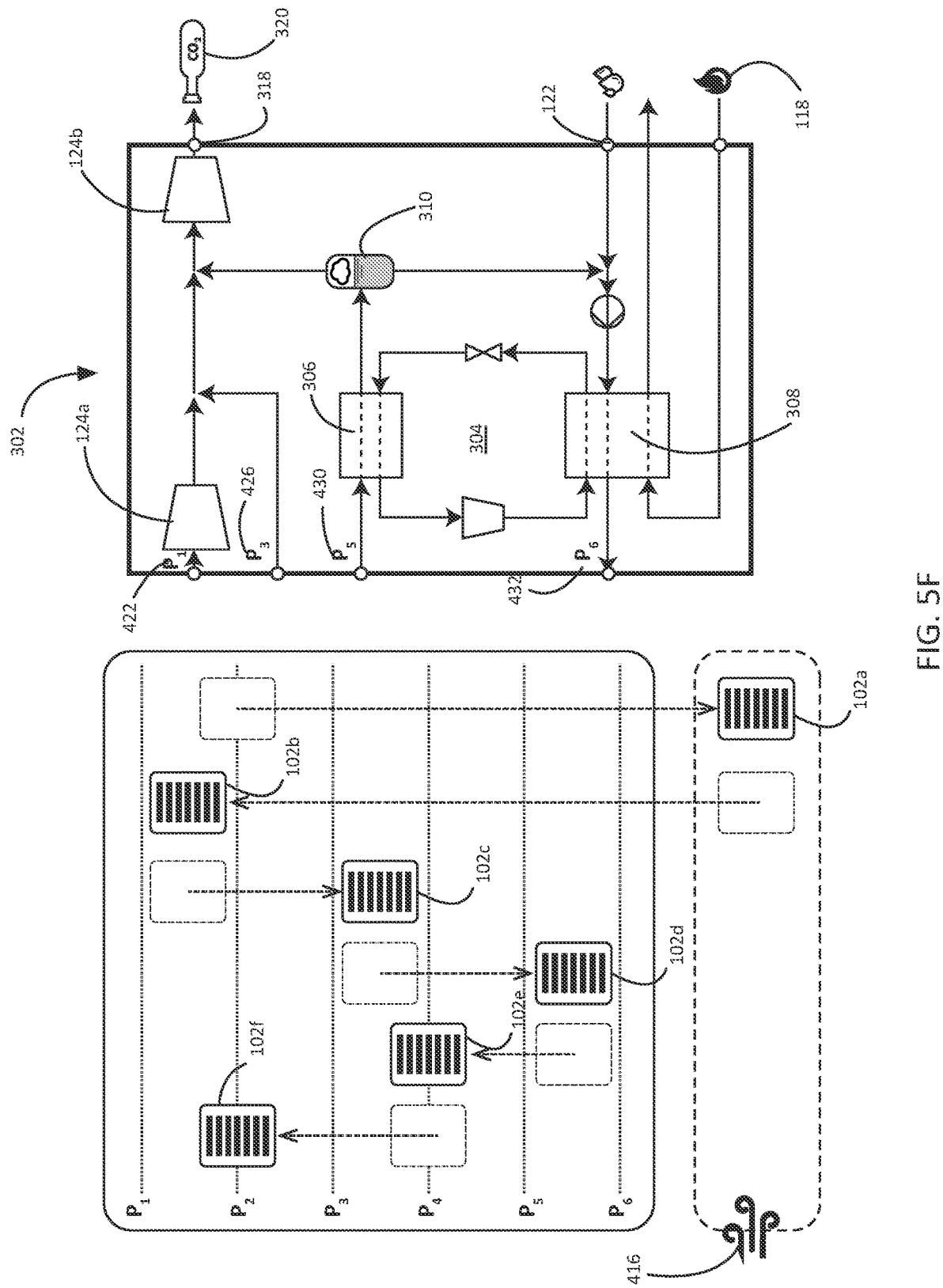

FIGS. 3A and 3B are schematic views of a non-limiting example of the contemplated system for efficient carbon dioxide capture 100 (hereinafter system 300). Specifically, FIG. 3A shows a schematic view of the system 300 architecture, and FIG. 3B shows a schematic representation of the system 300 while operating, dividing the plurality of capture units (here, sorbent vessels 102) into three subsets.

Contemplated herein is a system and method for efficiently integrating multiple carbon dioxide capture devices or units, such that they operate with greater efficiency together as a group then they would as individual units. In the context of the present description and the claims that follow, a capture unit is a device or portion of a device or system that is able to capture carbon dioxide from a source, such as the atmosphere. The capture devices 100 discussed with respect to FIGS. 1 and 2 are non-limiting examples of capture units. It should be noted that one of the benefits that comes from integrating multiple capture units as part of the contemplated systems and methods is that, in some embodiments, the capture unit itself may be simplified without sacrificing functionality. Such simplifications can result in greater efficiency, in terms of performance as a function of expended resources, operating costs, and/or capital costs. While much of the following discussion will be done in the context of embodiments where the capture units have been simplified to just the sorbent vessels 102, those skilled in the art will recognize that these systems and methods may be adapted for use with other capture units, including capture units that are more complicated or comprise more interconnected elements.

For example, in some embodiments, the water vessels 104 that were paired with the sorbent vessel 102 in FIGS. 1 and 2 may be entirely eliminated and replaced with multiple water vapor headers within the sorbent vessels 102 at varying pressures. In some embodiments, during the $CO_2$ recovery stage, after the sorbent vessel 102 is evacuated, water vapor 114 is first fed from a low-pressure header (i.e., water vapor 114 from a sorbent vessel 102 whose header is low-pressure) and successively switched to higher pressure headers, gradually increasing the internal pressure of that particular vessel 102.

In addition to eliminating the water vessel 104 and associated heater 118 (i.e., the heater 118 included in every device 100), the vacuum compressor 124 may also be eliminated in some embodiments, and replaced with a simple recycle blower since, in some embodiments, enough units have been integrated that the recovery subsystem 302 only needs to overcome a small pressure difference. During each step, the sorbent vessel 102 in the gas recovery phase sees increasing pressure while in the heat recovery phase, the sorbent vessel 102 sees declining pressure. As more pressure steps are included in the cycle, the smaller the blower energy requirement becomes. As an option, since water 112 cannot be entirely recovered, in some embodiments make-up water can be dispersed directly into the blower outlet.

As shown, the system 300 comprises a plurality of sorbent vessel 102, each comprising a sorbent structure 108 having a sorbent material 110. In some embodiments, the sorbent structure 108 remains enclosed within the sorbent vessel 102 in all three phases, with the vessel 102 opening up to allow the sorbent structure 108 to be exposed to atmospheric carbon dioxide. In other embodiments, the sorbent structure 108 is removed from the sorbent vessel 102 during the gas collection phase, and then resealed inside the vessel 102 for the gas and heat recovery phases.

Examples of sorbent materials 110 include, but are not limited to, moisture-swing sorbents, temperature-swing sorbents 322, pressure-swing sorbents, and the like. In some embodiments, the sorbent material 110 is a solid, while in other the sorbent material 110 may be a liquid, secured within the sorbent structure 108.

In the context of the present description and the claims that follow, the sorbent structure 108 is simply a structure sized to fit inside a sorbent vessel 102, and capable of securing the sorbent material 110 in a configuration that facilitates its exposure to the sorbate, as well as the release medium (e.g., liquid water, etc.).—

According to various embodiments, each sorbent vessel 102 is fluidically coupled to the recovery subsystem 302 or, more specifically, elements within the recovery subsystem 302. In some embodiments, each sorbent vessel 102 may also be coupled to a subset 324 of the plurality of sorbent vessels 102, while in other embodiments, each sorbent vessel 102 may be fluidically coupled to every other vessel 102 in the plurality of sorbent vessels 102. These fluidic couplings are each controlled with one of a plurality of valves 116, according to various embodiments.

The non-limiting example of the contemplated system 300 shown in FIG. 3A has 21 sorbent vessels 102. According to various embodiments, there are benefits to increasing the number of capture units (e.g., sorbent vessels 102, capture devices 100, etc.) integrated into the same system 300. Increasing the number of units makes the pressure/temperature differences smaller in each stage of the gas and recovery phases, increasing efficiency by decreasing the power requirements. However, there will be a point of diminishing returns with the increased cost and complexity required to implement a large network of fluidically interconnected elements. As a specific example, in one embodiment, the contemplated system 300 may have between 6 and 36 sorbent vessels 102 (i.e., collector units, etc.) feeding a single recovery subsystem 302. In another embodiment, the system 300 may comprise hundreds of capture units.

According to various embodiments, every sorbent vessel 102 (i.e., capture unit) in the system 300 is in fluidic communication with a recovery subsystem 302. In the context of the present description and the claims that follow, a recovery subsystem 302 is a collection of devices and resources used to facilitate sorbent vessels 102 move through the various stages of both the gas recovery phase and the heat recovery phase. These two phases, as well as the gas collection phase, will be discussed in greater detail with respect to FIG. 4A-4F.

As shown, in some embodiments, the recovery subsystem 302 may comprise a heat pump 304 in thermal communication with a condenser 306 and a vaporizer 308. The recovery subsystem 302 also comprises a two-stage vacuum compressor 124 and a liquid pump 312. Each element will be discussed, in turn.

According to various embodiments, the heat pump 304 is in thermal contact with both the condenser 306 and the vaporizer 308, indirectly exchanging heat between the two. Since this configuration may generate excess heat itself, in some embodiments, the overall system efficiency may be further improved by thermal integration with other capture unit operations.

The condenser 306 is in fluidic communication with a reservoir 310 that receives condensate 314 (i.e., liquid water 112) from the condenser 306 as it condenses the hot moisture-laden product gas from the gas recovery phase. The reservoir 310 also receives the product gas mixture from the vessels 102, comprising water vapor 114 and carbon dioxide 336. In some embodiments, the condenser 306 may be employed to withdraw water vapor 114 from vessels 102 in the heat recovery phase, instead of a vacuum compressor 124 or recycle blower.

The vaporizer 308, which may also be thought of as a re-vaporizer, is in fluidic communication with the reservoir 310 through a liquid pump 312, according to various embodiments. The liquid pump 312 is configured to deliver the liquid water 112 condensate 314 to the vaporizer 308, which returns it to a water vapor 114 for further use in the gas recovery phase.

According to various embodiments, all of the net energy associated with the sorbent swing cycle may be provided by the compressor within the heat pump 304. If supplemental heat is required to fully re-vaporize the condensate 314, it can be added from a separate heat source 118, such as from heat of compression in subsequent compression stages, or a separate heating element, via the same vaporizer-coupled heat exchanger of the heat pump 304.

Additionally, in some embodiments, the liquid pump 312 is also in fluidic communication with a make-up water valve 122 that can provide liquid water 112 to replace water lost elsewhere in the system 300. This condenser/re-vaporizer loop also affords the opportunity to provide make-up water, which can be simultaneously vaporized and directed to the high-pressure heat recovery stage sorbent vessels 102, as will be shown.

In some embodiments, the condenser 306, along with the vaporizer 308, serves to further simplify the structure of the system 300. As will be discussed in greater detail with respect to FIGS. 4A-4F and 5A-5F, the efficient integration of capture units by the contemplated system 300 is made possible by the reverse-pairing of capture units (e.g., sorbent vessels 102, etc.) in $CO_2$ recovery/heat recovery phases. In some embodiments, including the non-limiting example shown in FIG. 3A, the condenser 306 and the vaporizer 308, combined with the heat pump 304, is used as the final step in the gas recovery phase/heat recovery phase pairing. This provides a one-step offset, so that the high-pressure heat recovery stage is inherently at a higher pressure than the high-pressure $CO_2$ recovery stage. As a consequence, in some embodiments, the use of a recycle blower (which in some embodiments replaces the vacuum compressor 124) may be omitted altogether.

According to various embodiments, the recovery subsystem 302 comprises a vacuum compressor 124. As an option, the vacuum compressor 124 may be multi-stage, which may be advantageous for exposing different parts of the system 300 to different pressures. In other embodiments, the recovery subsystem 302 may comprise multiple vacuum compressors 124 operating at different pressures. As shown, the vacuum compressor 124 may be used to deliver a product stream 320 (e.g., $CO_2$-rich gas, etc.) through a product outlet 318. In some embodiments, the system 300 may comprise enough sorbent vessels 102 to be able to provide a product stream 320 that is continuous. Furthermore, in some embodiments, as previously mentioned, the pressure differentials within the reverse pairing may be small enough that the vacuum compressor 124 may be replaced with a recycle blower or other device that consumes less power.

FIG. 3B is a schematic view of the non-limiting example of a system shown in FIG. 3A, in operation. Each vessel 102 of the plurality of sorbent vessels 102 is configured to transition between a gas collection phase (i.e., pulling carbon dioxide 336 from the atmosphere), a gas recovery phase (i.e., causing the sorbent material 110 to release the carbon dioxide 336 captured from the atmosphere), and a heat recovery phase (i.e., pulling hot water vapor from vessels depleted of carbon dioxide 336 and using it in a gas recovery phase elsewhere in the system 300). As shown, the plurality of sorbent vessels 102 has vessels 102 in each of the three phases simultaneously.

More specifically, the plurality of sorbent vessels 102 may be divided into three subsets, a first subset 330 made of vessels 102 that are in the gas collection phase, a second subset 332 made of vessels 102 that are in the gas recovery phase, and a third subset 334 made of vessels 102 that are in the heat recovery phase.

As shown, the vessels 102 in the gas collection phase are not in fluidic communication with the interiors of the other vessels in other phases. The vessels of the first subset 330 are exposed to the atmosphere, while the rest of the system 300 (or more specifically, the inside of the rest of the system 300) is closed, partitioned away from the atmosphere. The vessels 102 in the heat recovery phase are in fluidic communication with vessels 102 in the gas recovery phase (the second subset 332), but only in one direction; the third subset 334 provides pressurized, heated water vapor 114 to the vessels 102 that are still shedding the captured carbon dioxide 336, but do not take in any fluids from the other vessels 102. Finally, the vessels 102 that are in the gas recovery phase (i.e., the second subset 332) are receiving pressurized fluids from the third subset 334, and is in fluidic communication with the recovery subsystem 302, which is driving the release of the capture carbon dioxide 336.

FIGS. 4A-4F are schematic views of the various stages of the three phases implemented in a non-limiting example of the contemplated system 300, from the perspective of a single sorbent vessel 102a within the system 300. FIGS. 5A-5F are schematic views of the same stages, instead showing the relative pressures of all of the sorbent vessels 102 in the system 300, for each of the stages.

It should be noted that the non-limiting example of the contemplated system 300 shown in FIGS. 4A-4F and 5A-5F has been chosen for clarity and ease of depiction. This system 300 comprises six sorbent vessels 102a-102f; at any given time, three of the vessels 102 will be in the gas recovery phase 400, two will be in the heat recovery phase 408, and one vessel will be in the gas collection phase 414. It should be noted that, according to various embodiments, there will typically be more vessels 102 in the gas collection phase 414 than in either of the other two phases, given the typical length of time each stage takes in these phases.

According to various embodiments, the gas recovery phase 400 will have one more gas recovery stage 402 than the heat recovery phase 408 has heat recovery stages 410. In other words, if the gas recovery phase 400 has N gas recovery stages 402, then according to various embodiments the heat recovery phase 408 will have (N−1) heat recovery stages 410.

In the non-limiting example shown in FIGS. 4A-5F, the system 300 comprises three gas recovery stages 402a-402c, and two heat recovery stages 410a and 410b. The gas collection phase 414 typically has a single stage comprising the sorbent material 110 of the vessel 102 being exposed to a fluid comprising the target sorbate (i.e., carbon dioxide).

The following discussion will be done in the context of a single sorbent vessel 102a. FIGS. 4A-4F show the nature of the fluidic communication between that vessel 102a and the rest of the system 300 in each stage. In the context of the present description and the claims that follow, a stage is simply a portion of a phase. It may be thought of as a waypoint for a portion of the system 300 (i.e., a subset of the vessels 102, the recovery subsystem 302, etc.) along the path taken through state space to accomplish the purpose of that phase. For example, the purpose of the gas recovery phase 400 is to recover the sorbate sorbed onto the sorbent material 110 of a subset of the plurality of vessels 102. As a vessel 102 progresses through the stages 402 that make up that phase 400, the pressure 418 and temperature 420 of that vessel 102 will increase as the sorbate is released.

A non-limiting example of the contemplated paired gas recovery and heat recovery cycle is shown in FIGS. 4A-5F. FIGS. 4A-4C and 5A-5C show the three gas recovery stages 402a-402c of the first sorbent vessel 102a.

After completing the $CO_2$ capture stage (i.e., exposing the sorbent material 110 to a source of carbon dioxide), the first sorbent vessel 102a encloses the sorbent structure 108, the sorbent material 110 laden with carbon dioxide 336. In some embodiments, this entails moving the sorbent structure 108 back inside of the vessel 102a, while in others this only requires the vessel 102a to close whatever opening exists to place the structure 108 in fluidic contact with the atmosphere 416 or other $CO_2$ source.

According to various embodiments, the vessel 102a is then initially evacuated. To avoid air contamination in the product, this sorbent vessel 102a can be pre-rinsed with $CO_2$ or evacuated through a dedicated vacuum compressor (not shown).

One strategy not requiring a dedicated compressor entails a pre-rinse with low-pressure $CO_2$ recycled from the product outlet 318 (i.e., the vacuum compressor outlet), pressure equalization with the sorbent vessel 102a moving out of the $CO_2$ capture stage and then evacuation successively to the 2nd stage 124b then 1st stage vacuum compressor 124a.

The first stage 402a of the gas recovery phase 400 or, more specifically, the equilibrium achieved after the fluidic contacts making up this first stage 402a have been established, comprises the vessel 102a being in fluidic contact with the fifth vessel 102e and the first stage of the vacuum compressor 124a. The first stage of the vacuum compressor 124a is at a first pressure 422. The fifth vessel 102e is in the final stage 410b of the heat recovery phase 408, and is at the second pressure 424.

In this first gas recovery stage 402a, the first vessel 102a has a pressure 418 between the first 422 and second 424 pressures. It should be noted that in the following discussion, various elements will be described as having one of six different pressures: the first pressure 422, the second pressure 424, the third pressure 426, the fourth pressure 428, the fifth pressure 430, and the sixth pressure 432, each increasing in pressure with the first pressure 422 being the lowest and the sixth pressure 432 being the highest. Pressures that are balanced between two of these six pressures will also be utilized.

It should be noted that while the following discussion of the various stages of the vessels 102 of the contemplated system 300 are being described as though all vessels transition between stages at the same time, or with the same rhythm, it should not be interpreted as a limitation, but rather a simplification of the illustration. In some embodiments, elements of the system 300 may transition between stages at roughly the same time, while in other embodiments, at least some of the stage transitions within a system may be, at least in part, asynchronous from other stage transitions or temporal events within the system 300.

While in the gas recovery phase 400, a vessel 102 will be releasing a product gas mixture 316 and receiving a water vapor 114 causing captured carbon dioxide 336 to desorb from the sorbent material 110.

The first (N−1) gas recovery stages 402 will comprise the vessel 102a being in fluidic communication with the recovery subsystem 302 at a downstream pressure 404 and a different vessel 102 in the heat recovery phase 408 at an upstream pressure 406. The upstream pressure 406 of each gas recovery stage 402 is greater than the upstream pressure 406 of the previous gas recovery stage 402.

The second gas recovery stage 402b of the first vessel 102a comprises the first vessel 102a being in fluidic communication with the second stage 124b of the vacuum compressor at a third pressure 426 (downstream pressure 404), as well as the third vessel 102c which is at the fourth pressure 428 (upstream pressure 406), since it is in the first heat recovery stage 410a.

It should be noted that in various embodiments, no sorbent vessels 102 are strictly in series and the "pairs" can be virtual. Any individual sorbent vessel 102 can be connected to any header at any time. Many sorbent vessels 102 can be associated with the same recovery system and header set. The number of sorbent vessels 102 in the gas capture phase can be varied independently of the number of sorbent vessels 102 in gas/heat recovery stages. In fact, this can be adjusted dynamically according to ambient operating conditions.

The Nth gas recovery stage 402, in this case the third gas recovery stage 402c, comprises the vessel 102a being in fluidic communication with the condenser 306 at a downstream pressure 404 equal to the fifth pressure 430 and the vaporizer 308 at the upstream pressure 406 equal to the sixth pressure 432.

The first vessel 102a then moves into the heat recovery phase 408, which in this non-limiting example has two stages 410a and 410b. If the gas recovery phase 400 has N stages 402, then the heat recovery phase 408 has (N−1) heat recovery stages 410, each heat recovery stage 410 comprising the vessel 102a being in fluidic communication with a different vessel 102 in the gas recovery phase 400 at a heating pressure 412. The heating pressure 412 decreases with each subsequent heat recovery stage 410.

In the first heat recovery stage 410a, the first vessel 102a is in fluidic contact with the fifth vessel 102e, having a heating pressure 412 that is between the fifth pressure 430 and the sixth pressure 432. According to various embodiments, the heating pressure 412 of a first heat recovery stage 410a of the (N−1) heat recovery stages 410 is lower than any downstream pressure 404 of the N gas recovery stages 402.

In the final heat recovery stage 410b, the first vessel 102a is in fluidic contact with the third vessel 102c, having a heating pressure 412 that is between the first pressure 422 and the second pressure 424. Finally, the first vessel 102a enters the gas collection phase 414, where its sorbent material 110 is in fluidic communication with the atmosphere 416, absorbing carbon dioxide 336, according to various embodiments.

Figure 6:
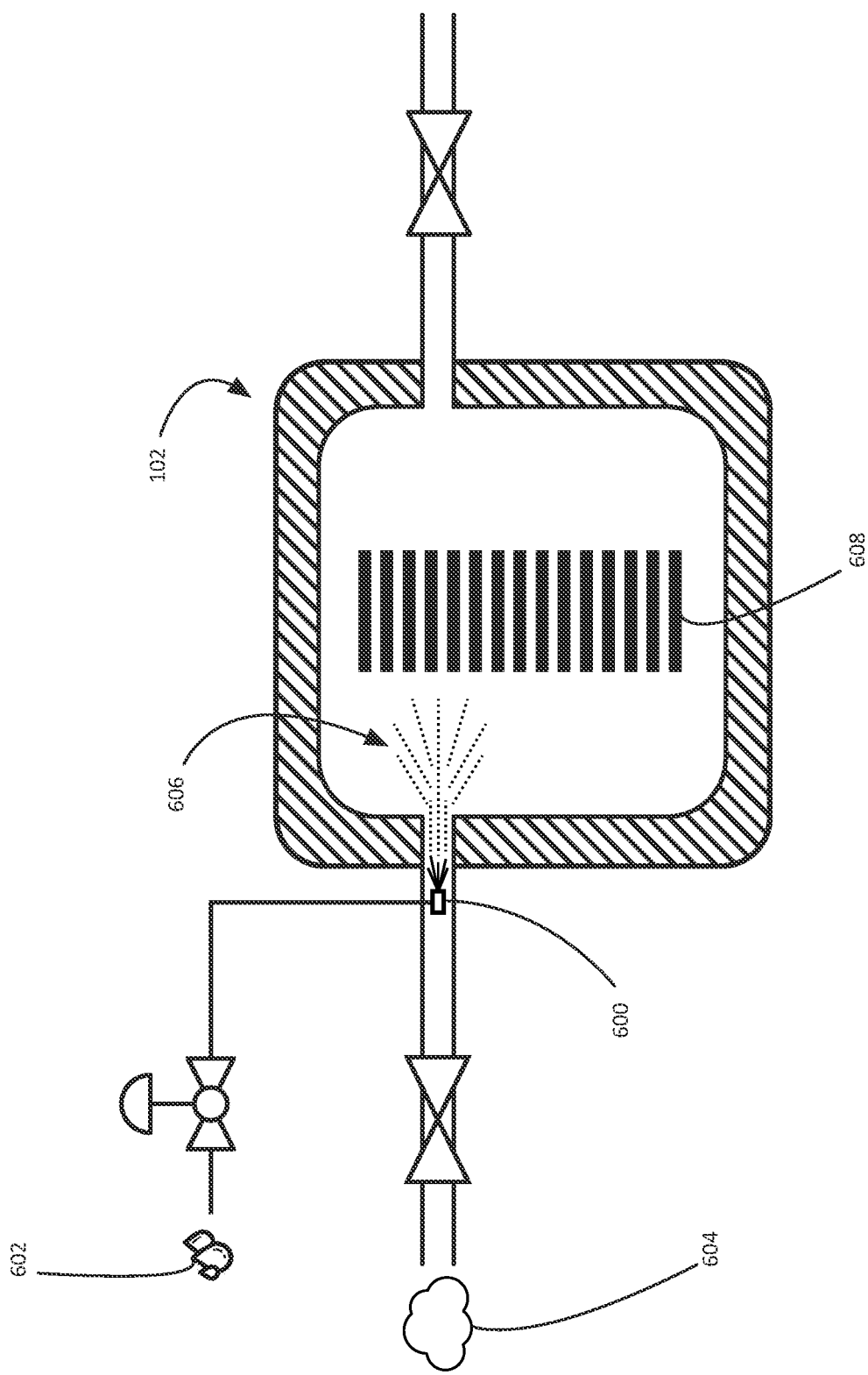
FIG. 6 is a schematic view of a sorbent vessel comprising a spray nozzle.

FIG. 6 is a schematic view of a non-limiting example of a sorbent vessel 102 comprising a spray nozzle 600. In embodiments making use of a moisture-swing sorbent material 608, delivery of liquid water 112 is an important consideration.

According to various embodiments, the method for liquid delivery within the sorbent vessel 102 may be one of immersion, spray, or aerosol, each of which will be discussed below. Immersion has the benefit of fully wetting all surfaces while simultaneously displacing all air and creating initial vacuum upon removal. It presents some mechanical challenges—either the sorbent 110 must be moved to a water bath, or water moved to the sorbent vessel 102. In one embodiment, at a reasonably high flow rate of 100 lpm, it would still take about 30 minutes to flood a typical sorbent vessel 102. Additional time would then be needed for draining. This is longer than the entire intended recovery stage period for a specific embodiment. Immersion would also increase water demand due to residual free water remaining on wetted surfaces.

Spraying requires much less water transfer. The sorbent structure 108 geometry makes it difficult for line-of-sight direction of spray to reach all sorbent surfaces, although it may be possible to wet much of the sorbent 110 by laterally spraying between the surfaces if a sorbent structure 108 having multiple planar surfaces is used. Water could more easily be sprayed to top surfaces and allowed to trickle down through spaces in the sorbent and support. Any water passing entirely through the sorbent 110 can be recovered. There is still likely to be considerable residual water remaining on wetted surfaces.

Water as suspended droplets in vapor (aerosol, fog, mist) may allow much less water transfer, and potentially reduce the amount of residual free water. Water vapor 114 could be the suspending gas.

The high area:volume ratio of water 112 in the system 300, whether as droplets 606 or on wetted surfaces, assures that some water 112 will evaporate if the surrounding water vapor pressure is below its saturation pressure. Evaporative cooling will then reduce the temperature of the vessel. The same amount of heat is consumed in all cases. In the case of immersion, the temperature change would be small because of the large sensible heat sink of the liquid water mass. In the case of aerosol, if the vapor 114 is superheated, the evaporative cooling of the droplets and the corresponding cooling of the vapor can be substantial. If it subsequently is condensed or sorbed onto the sorbent, then this cooling is reversed. Some embodiments employ this as a means to deliver liquid water 112 to the sorbent 110, by letting it evaporate then recondense, in-situ, with no external heat addition or removal.

As shown in FIG. 6, in some embodiments, each vessel 102 may comprise a spray nozzle 600 that is coupled to a liquid water supply 602. In some embodiments, the liquid water supply 602 may be the liquid water 112 within the reservoir 310 of the recovery subsystem 302, in other embodiments it may come from a make-up water valve 122, while in still other embodiments the liquid water 112 for the spray nozzles 600 may come from an entirely different source.

For each gas recovery stage 402, the water vapor 114 having the upstream pressure 406 may be used as a carrier gas 604 forcing liquid water 112 from the liquid water supply 602 out of the spray nozzle 600, creating a spray of liquid water droplets 606 to cause the carbon dioxide 336 to desorb from the sorbent material 110. In the context of the present description and the claims that follow, a spray of liquid water droplets may refer to a fog, a mist, a cloud, and the like. In some embodiments, the water vapor is superheated such as it would be in any of the previous depictions (e.g., vaporized in a separate enclosure and transferred with pressure letdown, recycled with a blower, recycled with condenser/vaporizer and superheater, etc.).

The resulting droplets will fully or partially evaporate, then recondense or sorb onto the sorbent 110. This reduces the likelihood of losing this aerosol liquid water by impingement on non-active surfaces. When droplets have an intermediate conversion to vapor 114, this vapor bypasses surfaces that are already warm, or at water sorption equilibrium, and goes to the sorbent 110 that still has water capacity or is colder than the saturation temperature. If the aerosol droplets only partially evaporate, they get smaller and more stable.

Smaller droplets have a lower settling velocity. Droplets with very small diameter (e.g., Knudsen number much greater than 1), are in the free molecular regime and will follow the vapor streamlines, bypassing warm non-active surfaces, and will be drawn by the vapor to the sorbent surfaces that are still condensing/sorbing water. For example, in one embodiment, at 60° C. 1-micron diameter water droplets in saturated water vapor have a Kn=1470. By controlling the amount of superheat in the carrier water vapor, the aerosol droplet diameter, stability, extent of vaporization/recondensation and subsequent delivery to preferred surfaces can be optimized.

Where the above examples, embodiments and implementations reference examples, it should be understood by those of ordinary skill in the art that other carbon dioxide capture units, sorbent vessels, systems and methods could be intermixed or substituted with those provided. In places where the description above refers to particular embodiments of a system and method for efficient carbon dioxide capture, it should be readily apparent that a number of modifications may be made without departing from the spirit thereof and that these embodiments and implementations may be applied to other carbon dioxide capture technologies as well. Accordingly, the disclosed subject matter is intended to embrace all such alterations, modifications and variations that fall within the spirit and scope of the disclosure and the knowledge of one of ordinary skill in the art.

What is claimed is:

1. A system for the efficient collection of carbon dioxide, comprising:
a recovery subsystem, comprising:
a heat pump in thermal communication with a condenser and a vaporizer, the condenser in fluidic communication with a reservoir;
a liquid pump in fluid communication with the reservoir and the vaporizer, the liquid pump configured to pump condensate to the vaporizer from the reservoir, revaporizing the condensate to form a water vapor; and
a vacuum compressor in fluid communication with a product outlet providing a product stream and also in fluidic communication with the reservoir;
a plurality of sorbent vessels each comprising a sorbent structure having a sorbent material, each sorbent vessel being in fluidic communication with the vacuum compressor, the condenser, and the vaporizer of the recovery subsystem and with at least a subset of the plurality of sorbent vessels, the fluidic communication of each sorbent vessel being controlled through a plurality of valves, each sorbent vessel of the plurality of sorbent vessels configured to transition between a gas collection phase, a gas recovery phase, and a heat recovery phase, with the plurality of sorbent vessels comprising the gas collection phase, the gas recovery phase, and the heat recovery phase simultaneously;
wherein the gas collection phase comprises the sorbent material of the sorbent vessel being in fluidic communication with the atmosphere, absorbing carbon dioxide;
wherein the gas recovery phase has N gas recovery stages, each sorbent vessel configured to transition through each of the N gas recovery stages sequentially, the sorbent vessel releasing a product gas mixture and receiving water vapor causing captured carbon dioxide to desorb from the sorbent material, the first (N−1) gas recovery stages comprising the sorbent vessel being in fluidic communication with the recovery subsystem at a downstream pressure and a different sorbent vessel in the heat recovery phase at an upstream pressure, the Nth gas recovery stage comprising the sorbent vessel being in fluidic communication with the condenser at the downstream pressure and the vaporizer at the upstream pressure, the upstream pressure being greater than the downstream pressure for each gas recovery stage, the upstream pressure of each gas recovery stage being greater than the upstream pressure of the previous gas recovery stage;
wherein the heat recovery phase has (N−1) heat recovery stages, each heat recovery stage comprising the sorbent vessel being in fluidic communication with a different sorbent vessel in the gas recovery phase at a heating pressure, the heating pressure decreasing in each subsequent heat recovery stage, the sorbent vessel configured to transition through each of the (N−1) heat recovery stages sequentially.

2. The system of claim 1, wherein the liquid pump of the recovery subsystem is coupled to a make-up water valve, with liquid water being added to the condensate being pumped to the vaporizer for vaporization and use in the gas recovery phase.

3. The system of claim 1, wherein the vaporizer of the recovery subsystem is coupled to a heat source.

4. The system of claim 1, wherein the heating pressure of a first heat recovery stage of the (N−1) heat recovery stages is lower than any downstream pressure of the N gas recovery stages.

5. The system of claim 1, wherein the product stream is continuous.

6. The system of claim 1, wherein the sorbent material is a temperature-swing sorbent material.

7. The system of claim 1, wherein the sorbent material is a moisture-swing sorbent material.

8. The system of claim 1:
wherein each sorbent vessel comprises a spray nozzle coupled to a liquid water supply;
wherein, for each gas recovery stage, liquid water is ejected through the spray nozzle creating a spray of liquid water droplets suspended in the water vapor having the upstream pressure so that liquid water is delivered to and deposited on the sorbent material to cause the carbon dioxide to desorb from the sorbent material.

9. A system for the efficient collection of carbon dioxide, comprising:
a recovery subsystem, comprising:
a heat pump in thermal communication with a condenser and a vaporizer, the condenser in fluidic communication with a reservoir;
a liquid pump in fluid communication with the reservoir and the vaporizer, the liquid pump configured to pump condensate to the vaporizer from the reservoir, revaporizing the condensate to form a water vapor; and
a vacuum compressor in fluid communication with a product outlet providing a product stream and also in fluidic communication with the reservoir;
a plurality of sorbent vessels having at least six sorbent vessels, each sorbent vessel comprising a spray nozzle and a sorbent structure having a moisture-swing sorbent material, the spray nozzle coupled to a liquid water supply, each sorbent vessel being in fluidic communication with the vacuum compressor, the condenser, and the vaporizer of the recovery subsystem and with at least a subset of the plurality of sorbent vessels, the fluidic communication of each sorbent vessel being controlled through a plurality of valves, each sorbent vessel of the plurality of sorbent vessels configured to transition between a gas collection phase, a gas recovery phase, and a heat recovery phase, with the plurality of sorbent vessels comprising the gas collection phase, the gas recovery phase, and the heat recovery phase simultaneously;
wherein the gas collection phase comprises the sorbent material of the sorbent vessel being in fluidic communication with the atmosphere, absorbing carbon dioxide;

wherein the gas recovery phase has N gas recovery stages, each sorbent vessel configured to transition through each of the N gas recovery stages sequentially, the sorbent vessel releasing a product gas mixture and receiving water vapor causing captured carbon dioxide to desorb from the sorbent material, the first (N−1) gas recovery stages comprising the sorbent vessel being in fluidic communication with the recovery subsystem at a downstream pressure and a different sorbent vessel in the heat recovery phase at an upstream pressure, the Nth gas recovery stage comprising the sorbent vessel being in fluidic communication with the condenser at the downstream pressure and the vaporizer at the upstream pressure, the upstream pressure being greater than the downstream pressure for each gas recovery stage, the upstream pressure of each gas recovery stage being greater than the upstream pressure of the previous gas recovery stage, the water vapor having the upstream pressure being a carrier gas forcing liquid water from the liquid water supply out of the spray nozzle, creating a spray of liquid water droplets to cause the carbon dioxide to desorb from the sorbent material;

wherein the heat recovery phase has (N−1) heat recovery stages, each heat recovery stage comprising the sorbent vessel being in fluidic communication with a different sorbent vessel in the gas recovery phase at a heating pressure, the heating pressure decreasing in each subsequent heat recovery stage, the sorbent vessel configured to transition through each of the (N−1) heat recovery stages sequentially.

10. The system of claim 9, wherein the heating pressure of a first heat recovery stage of the (N−1) heat recovery stages is lower than any downstream pressure of the N gas recovery stages.

11. The system of claim 9, wherein the product stream is continuous.

12. The system of claim 9, wherein the gas collection phase comprises separating the sorbent structure from the sorbent vessel.

13. The system of claim 9, wherein each sorbent vessel is coupled to every other sorbent vessel in the plurality of sorbent vessels.

14. A method for the efficient collection of carbon dioxide, comprising:
placing a plurality of sorbent vessels in fluidic communication with a recovery subsystem of the system, the sorbent vessels belonging to a system and each comprising a sorbent structure having a sorbent material, the recovery subsystem comprising:
a heat pump in thermal communication with a condenser and a vaporizer, the condenser in fluidic communication with a reservoir;
a liquid pump in fluid communication with the reservoir and the vaporizer, the liquid pump configured to pump condensate to the vaporizer from the reservoir, revaporizing the condensate to form a water vapor; and
a vacuum compressor in fluid communication with a product outlet providing a product stream and also in fluidic communication with the reservoir;
placing each sorbent vessel of a first subset of the plurality of sorbent vessels into a gas collection phase by placing the sorbent material of the sorbent vessel in fluidic communication with the atmosphere and absorbing carbon dioxide;

transitioning each sorbent vessel of a second subset of the plurality of sorbent vessels sequentially through N gas recovery stages of a gas recovery phase gradually increasing a sorbent vessel pressure and a sorbent vessel temperature, each gas recovery stage comprising the sorbent vessel receiving water vapor causing captured carbon dioxide to desorb from the sorbent material and the sorbent vessel releasing a product gas mixture comprising water vapor and carbon dioxide, wherein the first (N−1) gas recovery stages comprise placing the sorbent vessel in fluidic communication with the recovery subsystem at a downstream pressure and a different sorbent vessel in a heat recovery phase at an upstream pressure, wherein the Nth gas recovery stage comprises placing the sorbent vessel in fluidic communication with the condenser at the downstream pressure and the vaporizer at the upstream pressure, the upstream pressure being greater than the downstream pressure for each gas recovery stage, the upstream pressure of each gas recovery stage being greater than the upstream pressure of the previous gas recovery stage; and transitioning each sorbent vessel of a third subset of the plurality of sorbent vessels sequentially through (N−1) heat recovery stages of the heat recovery phase, gradually decreasing the sorbent vessel pressure and the sorbent vessel temperature, each heat recovery stage comprising placing the sorbent vessel in fluidic communication with a different sorbent vessel in the gas recovery phase at a heating pressure, the heating pressure decreasing in each subsequent heat recovery stage;

wherein the gas collection phase, the gas recovery phase, and the heat recovery phase all exist at the same time within the plurality of sorbent vessels.

15. The method of claim 14, wherein the heating pressure of a first heat recovery stage of the (N−1) heat recovery stages is lower than any downstream pressure of the N gas recovery stages.

16. The method of claim 14, wherein the product stream is continuous.

17. The method of claim 14, wherein the plurality of sorbent vessels comprises at least 6 sorbent vessels.

18. The method of claim 14, wherein placing each sorbent vessel of the first subset into the gas collection phase comprises separating the sorbent structure from each sorbent vessel.

19. The method of claim 14, wherein each sorbent vessel is coupled to every other sorbent vessel in the plurality of sorbent vessels.

20. The method of claim 14:
wherein each sorbent vessel comprises a spray nozzle coupled to a liquid water supply;
wherein, for each gas recovery stage, liquid water is ejected through the spray nozzle creating a spray of liquid water droplets suspended in the water vapor having the upstream pressure so that liquid water is delivered to and deposited on the sorbent material to cause the carbon dioxide to desorb from the sorbent material.

* * * * *